(12) United States Patent
Kinoshita et al.

(10) Patent No.: US 10,508,912 B2
(45) Date of Patent: Dec. 17, 2019

(54) ROAD SURFACE SHAPE MEASURING DEVICE, MEASURING METHOD, AND NON-TRANSITORY COMPUTER-READABLE MEDIUM

(71) Applicant: OMRON Corporation, Kyoto (JP)

(72) Inventors: Koichi Kinoshita, Kyoto (JP); Manabu Kawashima, Kyoto (JP)

(73) Assignee: OMRON Corporation, Kyoto (JP)

( * ) Notice: Subject to any disclaimer, the term of this patent is extended or adjusted under 35 U.S.C. 154(b) by 74 days.

(21) Appl. No.: 15/750,830

(22) PCT Filed: Dec. 6, 2016

(86) PCT No.: PCT/JP2016/086236
§ 371 (c)(1),
(2) Date: Feb. 6, 2018

(87) PCT Pub. No.: WO2017/158952
PCT Pub. Date: Sep. 21, 2017

(65) Prior Publication Data
US 2018/0224275 A1 Aug. 9, 2018

(30) Foreign Application Priority Data
Mar. 14, 2016 (JP) .................... 2016-050023

(51) Int. Cl.
*G01C 7/04* (2006.01)
*G01B 11/24* (2006.01)
(Continued)

(52) U.S. Cl.
CPC ............... *G01C 7/04* (2013.01); *G01B 11/24* (2013.01); *G06K 9/00791* (2013.01);
(Continued)

(58) Field of Classification Search
CPC .. G01C 7/04; G06K 9/00791; G06K 9/00798; G06T 7/521; G06T 7/55;
(Continued)

(56) References Cited

U.S. PATENT DOCUMENTS

2010/0299109 A1* 11/2010 Saito .................... G01S 11/12
703/1
2013/0328863 A1* 12/2013 Pirwani .................. G06T 15/00
345/419
(Continued)

FOREIGN PATENT DOCUMENTS

JP  2000-293687  10/2000
JP  2001-332595  11/2001
(Continued)

OTHER PUBLICATIONS

Office Action of Korean Counterpart Application, with English translation thereof, dated Nov. 28, 2018, pp. 1-5.
(Continued)

*Primary Examiner* — Carol Wang
(74) *Attorney, Agent, or Firm* — JCIPRNET

(57) ABSTRACT

A device configured to apprehend a road surface shape by using data measured by a measuring device appropriately apprehends a road surface shape. A road surface shape measuring device is provided with a road surface information acquiring unit and a road surface shape determining unit. The road surface information acquiring unit acquires road surface information about each of multiple points on a road surface, the road surface information including: a road surface position which is the position, of the road surface, on a reference plane divided into a plurality of sectioned regions; and a road surface height which is the height of the road surface at the road surface position. The road surface shape determining unit estimates respective surface shapes of the sectioned regions by using the road surface information included in the corresponding sectioned regions, and thereby determines a partial shape or the entire shape of the road surface.

20 Claims, 12 Drawing Sheets

(51) Int. Cl.
  *G06T 7/55* (2017.01)
  *G06T 7/11* (2017.01)
  *G06K 9/00* (2006.01)
  *G06T 7/521* (2017.01)

(52) U.S. Cl.
  CPC ............ *G06K 9/00798* (2013.01); *G06T 7/11* (2017.01); *G06T 7/521* (2017.01); *G06T 7/55* (2017.01); *G06T 2207/10028* (2013.01); *G06T 2207/30252* (2013.01); *G06T 2207/30256* (2013.01)

(58) Field of Classification Search
  CPC ............ G06T 7/11; G06T 2207/30252; G06T 2207/10028; G06T 2207/30256; G01B 11/24
  See application file for complete search history.

(56) References Cited

U.S. PATENT DOCUMENTS

| | | | | |
|---|---|---|---|---|
| 2014/0180497 | A1* | 6/2014 | Kojima | G06K 9/00798 701/1 |
| 2015/0120244 | A1 | 4/2015 | Ma et al. | |
| 2015/0227800 | A1* | 8/2015 | Takemae | B60R 1/00 382/104 |
| 2016/0171315 | A1* | 6/2016 | Yi | G06K 9/00791 382/154 |
| 2019/0001910 | A1* | 1/2019 | Motohashi | B60R 21/00 |

FOREIGN PATENT DOCUMENTS

| | | |
|---|---|---|
| JP | 2004-294152 | 10/2004 |
| JP | 2006-234682 | 9/2006 |
| JP | 2009-139323 | 6/2009 |
| JP | 2011-128844 | 6/2011 |
| JP | 2016-142533 | 8/2016 |
| WO | 2007010596 | 1/2007 |

OTHER PUBLICATIONS

"International Search Report (Form PCT/ISA/210) of PCT/JP2016/086236", dated Feb. 28, 2017, with English translation thereof, pp. 1-4.

"Written Opinion of the International Searching Authority (Form PCT/ISA/237) of PCT/JP2016/086236", dated Feb. 28, 2017, with English translation thereof, pp. 1-6.

"Search Report of Europe Counterpart Application," dated Oct. 2, 2019, pp. 1-9.

Laurent Smadja et al., "Road Extraction and Environment Interpretation From Lidar Sensors," Paparoditis N., Pierrot-Deseilligny M., Mallet C., Tournaire O. (Eds), IAPRS, vol. XXXVIII, Part 3A—Saint Mandé, France, Sep. 1-3, 2010, pp. 281-286.

\* cited by examiner

ROAD SURFACE SHAPE MEASURING DEVICE, MEASURING METHOD, AND NON-TRANSITORY COMPUTER-READABLE MEDIUM

CROSS-REFERENCE TO RELATED APPLICATION

This application is a 371 of international application of PCT application serial no. PCT/JP2016/086236, filed on Dec. 6, 2016, which claims the priority benefit of Japan application no. 2016-050023, filed on Mar. 14, 2016. The entirety of each of the abovementioned patent applications is hereby incorporated by reference herein and made a part of this specification.

TECHNICAL FIELD

The present invention relates to a road surface shape measuring device that measures a surface shape of a road surface having undulation or the like.

BACKGROUND ART

In the related art, an advanced driver assistance system (ADAS) that recognizes an obstacle near a moving body such as a vehicle and performs control of a moving body on behalf of a driver of the moving body on the basis of a positional relationship between the obstacle and the moving body is known. On the other hand, it is also important to recognize not only an obstacle near the moving body but also the state of a road surface on which the moving body moves. For example, when the undulation of the road surface is intense, it is important to control the moving body so that the moving body avoids the road surface with the intense undulation, or to notify of the presence of the road surface with the intense undulation.

For example, Patent Literature 1 discloses a road surface property and state measuring device that measures a road surface profile and three-dimensional geographical coordinates of each point of the road surface, and associates the road surface profile with the geographic coordinates to generate data regarding unevenness of the road surface. In this device, it is easy to recognize the road surface profile by displaying data regarding the unevenness of the road surface obtained as described above as an image reflected on an actual road surface image.

CITATION LIST

Patent Literature

Patent Literature 1

Japanese Unexamined Patent Application Publication No. 2004-294152

SUMMARY OF INVENTION

Technical Problem

In the road surface property and state measuring device, the road surface profile is measured as a distance between a point on the road surface and a moving body to which the device has been attached. That is, data regarding the unevenness of the road surface obtained by this device is point data represented by a three-dimensional coordinate value.

In such a case, in order for the device itself to recognize the shape of the road surface, the device requires a large number of pieces of data regarding the unevenness, and as a result, it is necessary to perform enormous calculations.

An object of the present invention is to appropriately recognize a road surface shape with a small amount of calculation in a device that recognizes the road surface shape using data measured by a measuring device or the like.

Solution to Problem

Hereinafter, a plurality of aspects will be described as a means for solving the problem. The modes can be arbitrarily combined as necessary.

The road surface shape measuring device according to an aspect of the present invention measures a shape of a road surface having undulation. The road surface shape measuring device includes a road surface information acquisition unit and a road surface shape determining unit. The road surface information acquisition unit acquires road surface information including a road surface position and a road surface height for a plurality of points on the road surface. The road surface position is a position of the road surface on a reference plane divided into a plurality of segmented regions. The road surface height indicates a height from the reference plane of the road surface at the road surface position. The road surface shape determining unit determines a shape of a part or all of the road surface by estimating a surface shape using the road surface information included in the segmented region for each segmented region.

In the road surface shape measuring device, the road surface information acquisition unit acquires the position (the road surface position) of the road surface on the reference plane and the height (the road surface height) of the road surface at the road surface position as the road surface information for a plurality of points on the road surface. Thereafter, the road surface shape determining unit estimates the surface shape of each segmented region using the road surface information included in each of the plurality of segmented regions defined by segmenting the reference plane. The road surface shape determining unit determines a shape of a part or all of the road surface on the basis of the surface shape of the segmented region.

Thus, in the road surface shape measuring device, the surface shape (that is, the shape of a part of the road surface) is estimated for each segmented region using the road surface information included in the segmented region. Further, the shape of a part or all of the road surface is determined on the basis of the surface shape estimated for each segmented region.

Accordingly, the road surface shape can be appropriately recognized with a smaller amount of calculation, as compared with a case in which the shape of the entire road surface is determined using all of the road surface information acquired in the entire reference plane.

The road surface information acquisition unit may include an energy measurement unit, a distance image acquisition unit, and a coordinate transformation unit. The energy measurement unit measures energy reflected by the road surface. The distance image acquisition unit acquires a distance image. The distance image is an image including a plurality of pixels each having a distance between the road surface and the road surface information acquisition unit measured on the basis of the energy as a pixel value. The coordinate transformation unit calculates the road surface information by associating each pixel of the distance image with the position of the reference plane to calculate the road surface position and calculating the road surface height at the road surface position on the basis of the pixel value of each pixel.

Accordingly, the road surface information acquisition unit can calculate the road surface information using the energy reflected by the road surface.

When there are a predetermined number or more of pieces of road surface information in the segmented region, the road surface shape determining unit may determine that the surface shape of the segmented region is estimated. On the other hand, when there are not the predetermined number or more of pieces of road surface information in the segmented region, the road surface shape determining unit may determine that the surface shape of the segmented region is not estimated.

Accordingly, it is possible to appropriately estimate the surface shape of the road surface at an appropriate timing such as a point in time when a number of pieces of road surface information allowing estimation of an appropriate surface shape are collected.

When the number of the plurality of pieces of road surface information included in the segmented region in which the surface shape is to be estimated increases as compared with the number at the time of previous estimation of the surface shape, the road surface shape determining unit may update the previously estimated surface shape using the road surface information of which the number of pieces has increased.

Accordingly, the surface shape estimated more appropriately using more road surface information can be determined as the shape of the road surface.

When a surface shape estimated for one segmented region and a surface shape estimated for a segmented region adjacent to the one segmented region are discontinuous within the reference plane, the road surface shape determining unit may correct the surface shape estimated for the one segmented region to be continuously connected to the surface shape estimated for the adjacent segmented region.

Accordingly, when discontinuity occurs between a plurality of surface shapes estimated in the adjacent segmented regions, the discontinuity can be eliminated and an appropriate surface shape can be estimated in each segmented region.

A size of the segmented region may be determined on the basis of a distance between the road surface information acquisition unit and the segmented region in the reference plane.

Accordingly, even when the size of the region in the reference plane in which there may be one piece of road surface information is changed according to the position in the reference plane from the road surface information acquisition unit, as much road surface information as possible can be acquired for one segmented region.

The road surface information acquisition unit may move on the reference plane. In this case, the road surface information acquisition unit accumulates the road surface information acquired at different times while moving. The road surface shape determining unit estimates the surface shape using the accumulated road surface information.

Accordingly, it is possible to estimate the surface shape more appropriately in each segmented region by including more road surface information in the segmented region.

The road surface shape determining unit may estimate a surface shape function that is calculated by fitting a predetermined function to the road surface information included in the segmented region as the surface shape in the segmented region. Accordingly, the surface shape can be represented using a mathematical model such as a surface shape function matching the road surface information.

The road surface shape determining unit may estimate a surface shape function matching the road surface information with a newer acquisition time as representing the surface shape of the segmented region during calculation of the surface shape function.

Accordingly, a more appropriate surface shape can be estimated using road surface information with higher reliability.

The predetermined function may include a first shape function representing a step on the road surface and a second shape function representing an inclined plane on the road surface. In this case, the road surface shape determining unit estimates the shape function further matching the road surface information included in the segmented region among the first shape function and the second shape function as the surface shape function.

Accordingly, the surface shape function can be more simply determined using the first shape function and the second shape function that have been determined in advance.

The road surface shape measuring device may further include a road surface state determining unit. The road surface state determining unit determines a road surface state of the road surface on the basis of the surface shape estimated by the road surface shape determining unit. Accordingly, it is possible to determine an actual road surface state of the road surface.

A measuring method according to another aspect of the present invention is a method of measuring a shape of a road surface having undulation. The measuring method includes the following steps.

A step of acquiring road surface information for a plurality of points on the road surface, the road surface information including a road surface position of the road surface on a reference plane divided into a plurality of segmented regions, and a road surface height indicating a height from the reference plane of the road surface at the road surface position.

A step of determining a shape of a part or all of the road surface by estimating a surface shape using the road surface information included in the segmented region for each segmented region.

In the measuring method, the surface shape (that is, the shape of a part of the road surface) is estimated for each segmented region using the road surface information included in the segmented region. Further, the shape of a part or all of the road surface is determined on the basis of the surface shape estimated for each segmented region.

Accordingly, the road surface shape can be appropriately recognized with a smaller amount of calculation, as compared with a case in which the shape of the entire road surface is determined using all of the road surface information acquired in the entire reference plane.

A program according to still another aspect of the present invention is a program that causes a computer to execute the measuring method.

Advantageous Effects of Invention

It is possible to appropriately recognize the road surface shape with a small amount of calculation when the road surface shape is recognized using the data measured by the measuring device or the like.

DESCRIPTION OF EMBODIMENTS

Figure 1:
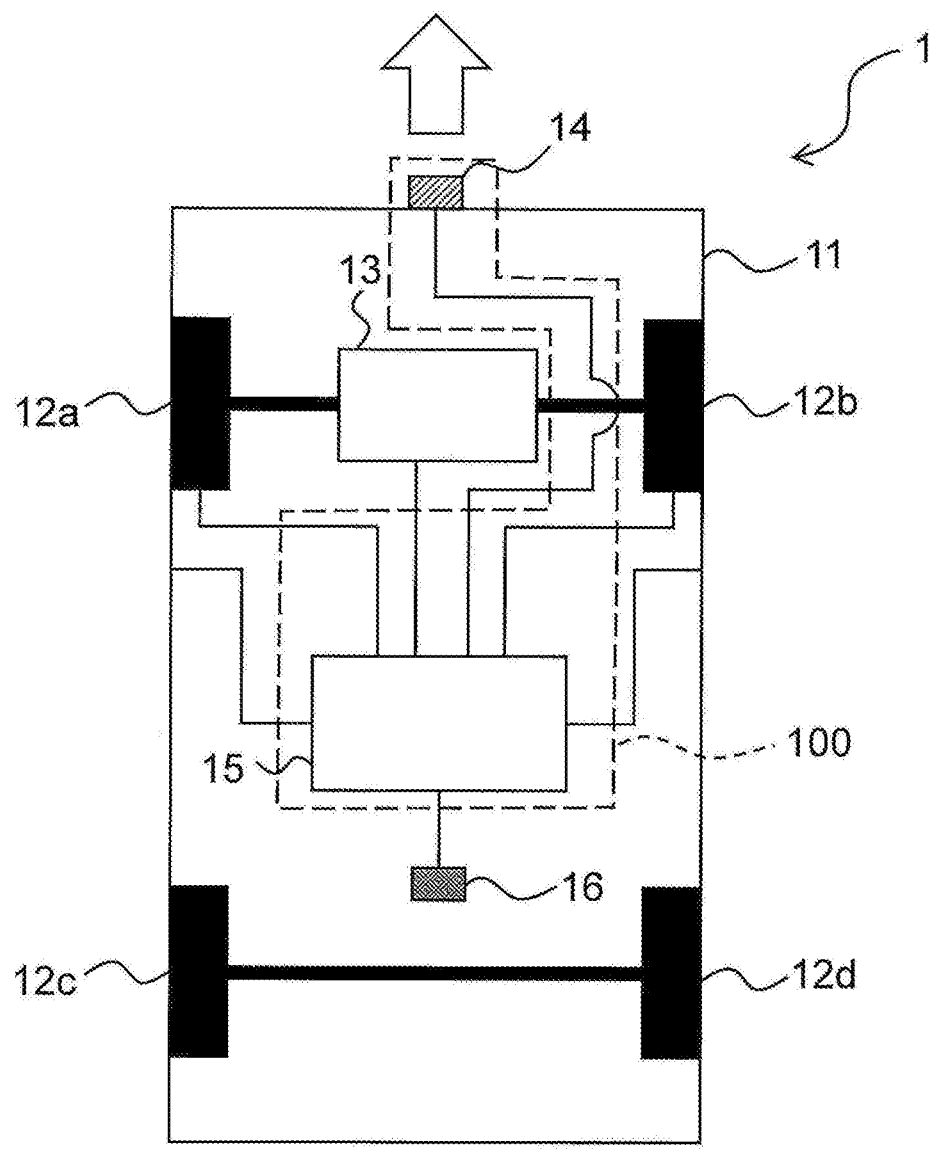
FIG. 1 is a diagram illustrating a configuration of a moving body system in which a road surface shape measuring device is used.

1. First Embodiment (1) Configuration of Moving Body System Using Road Surface Shape Measuring Device Hereinafter, a configuration of a moving body system 1 in which the road surface shape measuring device 100 according to a first embodiment is used will be described with reference to FIG. 1. FIG. 1 is a diagram illustrating a configuration of a moving body system in which a road surface shape measuring device is used. The road surface shape measuring device 100 according to the first embodiment is, for example, a device that is attached to a main body 11 of a moving body such as a car and measures undulation of a road surface RS on which the moving body moves. The road surface shape measuring device 100 assists a driver with operation of the moving body as necessary.

The moving body system 1 includes the main body 11. The main body 11 constitutes a main body of the moving body system 1. The moving body system 1 includes wheels 12a, 12b, 12c, and 12d. The wheels 12a and 12b are attached to an output rotation shaft of the drive unit 13 (for example, an engine and/or an electric motor) to be rotatable around a shaft via a deceleration mechanism at a front part in the straight traveling direction of the main body 11 (FIG. 1). Meanwhile, the wheels 12c and 12d are attached to a rear part in the straight traveling direction of the main body 11 to be rotatable around a shaft.

The moving body system 1 includes an object detection sensor 14 (an example of an energy measurement unit). As illustrated in FIG. 1, the object detection sensor 14 is attached to the foremost part of the main body 11 in the straight traveling direction so that a detection surface DS (to be described below) is parallel to the road surface or toward the road surface slightly from the parallel direction. As a result, the object detection sensor 14 measures the reflected light Lr reflected from a wide range of the road surface in front of the main body 11.

In the embodiment, the object detection sensor 14 is a time of flight (TOF) sensor. The object detection sensor 14 is not limited to the TOF sensor, and a sensor capable of outputting a signal according to energy such as ultrasonic waves or light and detecting a reflection signal that is generated by the signal being reflected by the road surface RS can be used. Examples of such a sensor include a laser range finder (LRF). A configuration of the object detection sensor 14 in the embodiment will be described in detail below.

In the embodiment, the object detection sensor 14 is attached only to the foremost part in the straight traveling direction of the main body 11, but the present invention is not limited thereto, and the object detection sensor 14 may be attached to another position such as a rearmost part in the straight traveling direction of the main body 11. Thus, for example, when the main body 11 is moved in a direction other than a forward traveling direction, a road surface state in the direction other than the forward traveling direction can be confirmed.

The moving body system 1 includes a control unit 15. The control unit 15 is a computer system including a central processing unit (CPU), a storage device (a random access memory (RAM), a read only memory (ROM), a solid state drive (SSD), or a hard disk drive (HDD), or the like), and various interfaces (for example, a A/D converter or a D/A converter). The control unit 15 receives a detection signal from the object detection sensor 14 and determines the state of the road surface RS in the direction in which the main body 11 is about to move on the basis of the detection signal.

In the embodiment, the control unit 15 is connected to a brake drive mechanism provided in the wheels 12a and 12b, a drive mechanism (for example, an accelerator or a motor control device) of the drive unit 13, a drive mechanism of a handle, and/or the like. The control unit 15 controls the driving mechanism on behalf of the driver of the moving body system 1 as necessary on the basis of a state of the road surface in the direction in which the main body 11 is about to move. A configuration of the control unit 15 will be described in detail below.

The moving body system 1 includes a position measurement unit 16. The position measurement unit 16 measures a relative position change in a real space when the main body 11 has moved. For example, the position measurement unit 16 may use, for example, a speed sensor that measures a speed of the main body 11, an acceleration sensor that measures an acceleration, and/or a gyro sensor that measures an angular speed of the main body 11. Further, for example, a Global Positioning System (GPS) device can be used as the position measurement unit 16.

With the above configuration, the moving body system 1 can deter nine the state of the road surface RS on which the main body 11 is about to move on the basis of the detection signal detected by the object detection sensor 14. Further, the moving body system 1 can assist the driver of the moving body system 1 with driving on the basis of the determined state of the road surface RS. In the embodiment, the object detection sensor 14 and the control unit 15 constitute the road surface shape measuring device 100.

(2) Configuration of Object Detection Sensor

Figure 2:
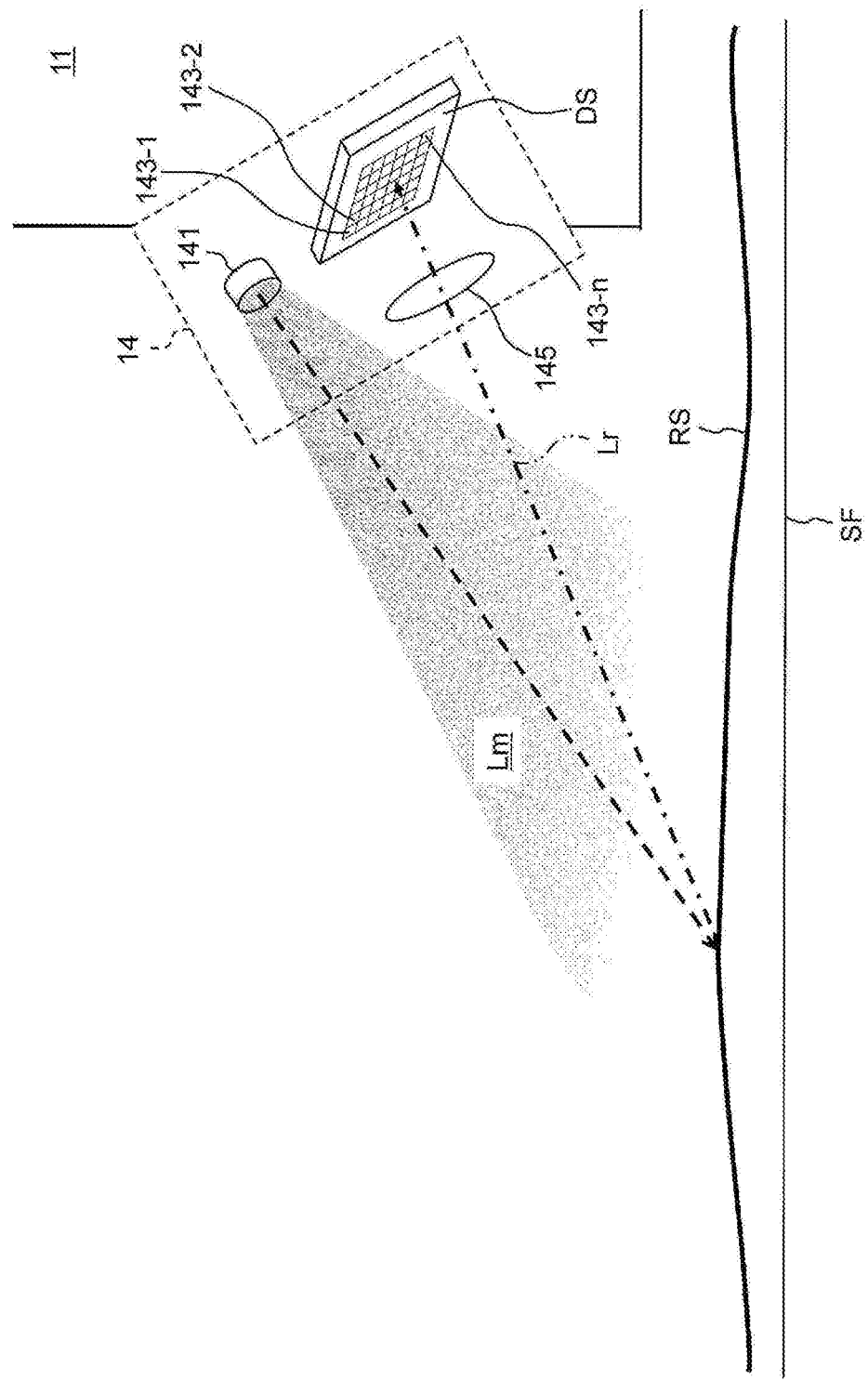
FIG. 2 is a diagram illustrating a configuration of an object detection sensor.

Next, a configuration of the object detection sensor 14 that is used in the road surface shape measuring device 100 according to the embodiment will be described with reference to FIG. 2. FIG. 2 is a diagram illustrating a configuration of the object detection sensor.

The object detection sensor 14 has an output unit 141. The output unit 141 is, for example, a light source that outputs measurement light L an infrared region toward the road surface RS that is a detection target. In the embodiment, it is preferable that the output unit 141 output the measurement light Lm over a wide range of the road surface RS on which the main body 11 is about to move. Accordingly, the object detection sensor 14 can simultaneously irradiate a wide range of the road surface RS with the measurement light Lm in a direction in which the main body 11 is about to move.

The object detection sensor 14 includes a plurality of detection units 143-1, 143-2, . . . , 143-n. Each of the plurality of detection units 143-1, 143-2, . . . , 143-n is disposed, for example, at a predetermined position on the detection surface DS (a semiconductor substrate), and detects reflected light Lr that is generated by the measurement light Lm being reflected by the road surface RS. The detection units 143-1 to 143-n are, for example, charge coupled devices or complementary MOS (CMOS) devices.

Further, as illustrated in FIG. 2, the plurality of detection units 143-1 to 143-n are arranged in a vertical direction and a horizontal direction on the detection surface DS to form an array. Accordingly, the plurality of detection units 143-1 to 143-n can form a CCD image sensor or a CMOS image sensor on the detection surface DS.

A switching element (for example, a MOS-FET) for connecting/disconnecting the detection unit to and from the external control unit 15 is connected to each of the plurality of detection units 143-1 to 143-n. Further, an address line is connected to the switching element, and when a signal is applied to the address line, the switching element is turned ON, and the detection unit connected to the switching element that has been turned ON can transmit and receive signals to and from the control unit 15.

Since the detection surface DS has the plurality of detection units 143-1 to 143-n, the object detection sensor 14 can detect the reflected light Lr generated from the wide range of the road surface RS. Which detection unit detects the reflected light Lr from a certain position on the road surface RS is determined according to a relative arrangement position of the detection unit from a center of the detection surface DS.

For example, when the output unit 141 and the detection surface DS are arranged side by side in a height direction of the main body 11 as illustrated in FIG. 2, the reflected light Lr from the road surface RS in a straight traveling direction of the main body 11 is detected by the detection unit close to a center of the detection surface DS. On the other hand, the reflected light Lr from the road surface RS located at a position close to or far from the object detection sensor 14 is detected by the detection unit present in a lower part or an upper part of the detection surface DS separated from the center of the detection surface DS.

Further, the reflected light Lr from the road surface RS in a direction deviating from the straight traveling direction of the main body 11 is detected by the detection unit present on the left side or the right side of the detection surface DS.

Thus, the plurality of respective detection units 143-1 to 143-n can detect the reflected light Lr from different positions of the road surface RS in a wide range.

The object detection sensor 14 includes a lens 145. The lens 145 focuses the reflected light Lr on a region in which the plurality of detection units 143-1 to 143-n are formed in the detection surface DS. Accordingly, an image of the road surface RS in the real space can be formed in the region in which the plurality of detection units 143-1 to 143-n are formed.

With the above configuration, the object detection sensor 14 can measure the reflected light Lr from the road surface RS in the wide range in the direction in which the main body 11 on the reference plane SF is about to move. Further, since the plurality of respective detection units 143-1 to 143-n can detect the reflected light Lr from the different positions of the road surface RS, a distance image (to be described below) including a plurality of pixels having a distance between the road surface RS and the object detection sensor 14 as a pixel value can be acquired on the basis of a measurement result of the reflected light Lr detected by the object detection sensor 14.

In the following description, the reference plane SF on which the road surface RS is arranged is assumed to be expressed in an XY coordinate system in a real space (XYZ coordinate system). Further, a height direction from the reference plane SF is assumed to be expressed as a coordinate value of the Z axis.

(3) Configuration of Control Unit

Figure 3:
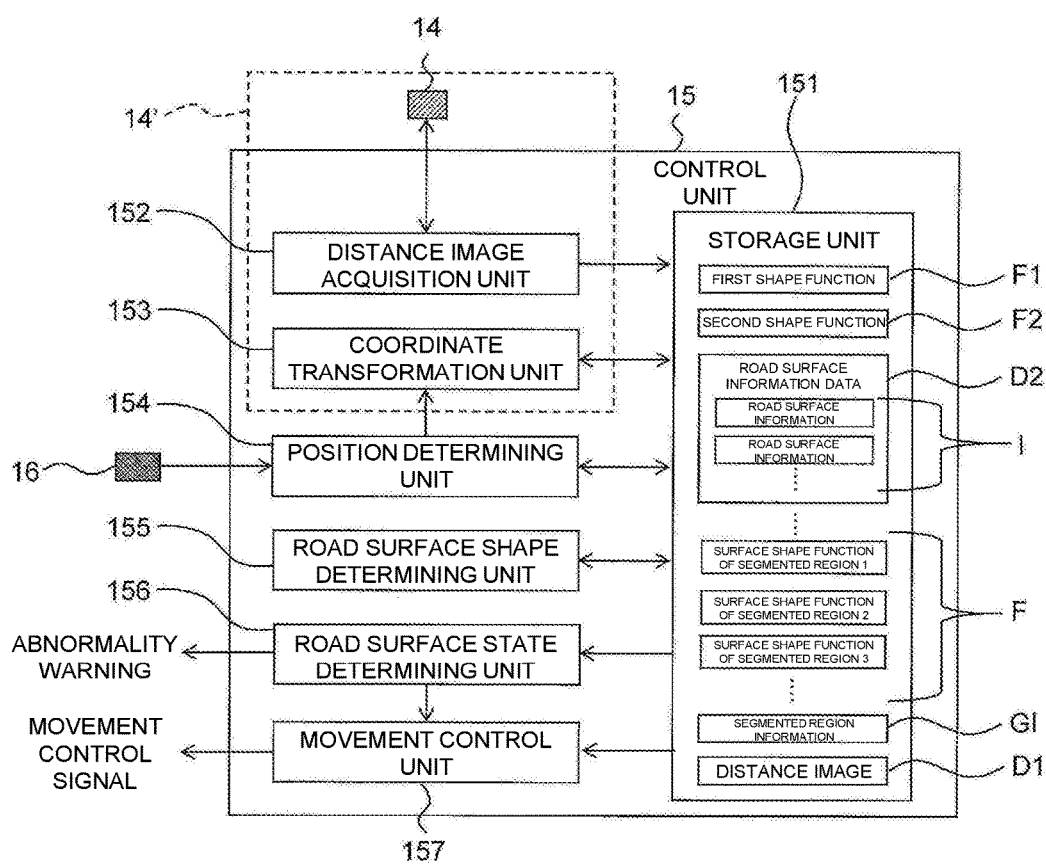
FIG. 3 is a diagram illustrating a configuration of a control unit.

Hereinafter, a configuration of the control unit 15 of the road surface shape measuring device 100 according to the embodiment will be described with reference to FIG. 3. FIG. 3 is a diagram illustrating the configuration of the control unit. Some or all of functions of respective elements of the control unit 15 to be described below may be realized as a program executable in a computer system constituting the control unit 15. In this case, the program may be stored in a storage region formed in a storage device of the computer system. Further, some or all of the functions of the elements of the control unit 15 may be realized by hardware using a custom IC or the like.

The control unit 15 has a storage unit 151. The storage unit 151 is, for example, a part of a storage region provided in a storage device of a computer system that stores various types of data.

The control unit 15 includes a distance image acquisition unit 152. The distance image acquisition unit 152 acquires a distance image D1. The distance image acquisition unit 152 acquires the distance image D1 as follows.

After the measurement light Lm is output from the output unit 141, the distance image acquisition unit 152 first applies a signal to an address line corresponding to the first detection unit 143-1 to connect the first detection unit 143-1 to the distance image acquisition unit 152 and receive a signal (for example, a current or voltage signal) indicating whether or not the detection unit 143-1 has detected the reflected light Lr.

After the distance image acquisition unit 152 receives the signal, the distance image acquisition unit 152 calculates a difference between a time when the signal indicating whether or not the reflected light Lr is detected has been received and a time at which the output unit 141 has output the measurement light Lm, as signal detection information DT. That is, the signal detection information DT is information corresponding to a distance between the road surface RS and the object detection sensor 14.

When the reflected light Lr is not detected, no signal is input from the detection unit 143-1, and therefore, the signal detection information DT is set to infinity (or a very great value).

Then, the distance image acquisition unit 152 calculates the distance between the road surface RS and the object detection sensor 14 from the signal detection information DT. The distance d can be calculated by c*DT/2 (c: light speed).

Then, the distance image acquisition unit 152 generates the first position information (x, y, d). The first position information corresponds to one unit, that is, one pixel of the distance image D1 generated by associating a coordinate value (x, y) obtained by projecting the arrangement position of any one of the detection units 143-1 to 143-$n$ onto the first coordinate with the distance d.

Thereafter, the distance image acquisition unit 152 executes the above steps for all the other detection units 143-1, 143-2, 143-3, . . . , 143-$n$ by sequentially changing the address line to which the signal is applied, to generate sets (x1, y1, d1), (x2, y2, d2), (xn, yn, d n) of n pieces of first position information (pixels). The sets of the n pieces of first position information are stored in the storage unit 151 as the distance image D1.

The coordinate value to be associated with the distance d calculated from the signal detection information is determined in advance for each detection unit, and is determined, for example, on the basis of the arrangement relationship on the detection surface DS of each detection unit. For example, y2 is equal to y1 at the coordinate value (x2, y2) assigned to the detection unit 143-2 adjacent in the horizontal direction to the detection unit 143-1. On the other hand, for example, xm is equal to x1 in a coordinate value (xm, ym) assigned to the detection unit 143-$m$ adjacent in the horizontal direction to the detection unit 143-1.

Further, since the plurality of detection units 143-1 to 143-$n$ of the object detection sensor 14 detect the reflected light Lr from different positions of the road surface RS, the distance image D1 can project the road surface RS detected by the object detection sensor 14 onto the first coordinates. Further, as described above, the distance between the road surface RS detected by each detection unit and the object detection sensor 14 is associated with the first position information (pixel) constituting the distance image D1.

Therefore, the distance image D1 obtained as described above is configured of a plurality of pixels (first position information), and each of the plurality of pixels can be said to be an image that projects the road surface RS measured by the object detection sensor 14 onto the first coordinates, in which the distance between the road surface RS and the object detection sensor 14 measured on the basis of the reflected light Lr is a pixel value.

The control unit 15 includes a coordinate transformation unit 153. The coordinate transformation unit 153 calculates the road surface information I. The road surface information I is information including a road surface position indicating the position of the road surface RS in the reference plane SF (FIG. 2) defining the road surface RS, and a road surface height indicating a height of the road surface RS present at the road surface position from the reference plane SF.

Specifically, the coordinate transformation unit 153 associates each pixel (the first position information) included in the distance image D1 with the position (the coordinate value) in the reference plane SF to calculate the road surface position included in the road surface information I. The plurality of detection units 143-1 to 143-$n$ and the real space are associated with each other by performing calibration in advance. Meanwhile, the road surface height included in the road surface information I is calculated on the basis of the pixel value (the distance d) associated with the pixel (the first position information) corresponding to the road surface position for which the road surface height is to be calculated.

As described above, since the object detection sensor 14 includes the plurality (n) of detection units 143-1 to 143-$n$, the coordinate transformation unit 153 calculates n road surface information I-1 to I-n for n points on the road surface RS.

In the embodiment, the object detection sensor 14, the distance image acquisition unit 152, and the coordinate transformation unit 153 constitute the road surface information acquisition unit 14'.

The control unit 15 includes a position determining unit 154. After the main body 11 has moved, the position determining unit 154 determines the position on the reference plane SF of the object detection sensor 14 (the road surface information acquisition unit 14'). Specifically, the position determining unit 154 determines the position on the reference plane SF of the object detection sensor 14 after the movement on the basis of the position of the object detection sensor 14 in the reference plane SF before the movement, relative position change information in a real space of the main body 11 measured by the position measurement unit 16, and an installation position of the object detection sensor 14 in the main body 11.

For example, when the position measurement unit 16 is a GPS device, the position determining unit 154 can determine the position of the main body 11 in the reference plane SF from a position (for example, latitude and longitude) measured by the GPS device.

On the other hand, when an actual measurement value of the speed is input from the position measurement unit 16, the moving distance of the main body 11 can be calculated by accumulating or temporally integrating the speed of the main body 11 within a predetermined time, and a position after the movement by the movement distance from the position of the reference plane SF before the movement can be determined as the position of the object detection sensor 14 after the movement.

Further, when an actual measurement value of an acceleration is input from the position measurement unit 16, the movement distance can be calculated by calculating the speed from the acceleration, and accumulating or temporally integrating the speed. Then, the position after the movement by the movement distance from the position before the movement can be determined as the position of the object detection sensor 14 after the movement.

Figure 4:
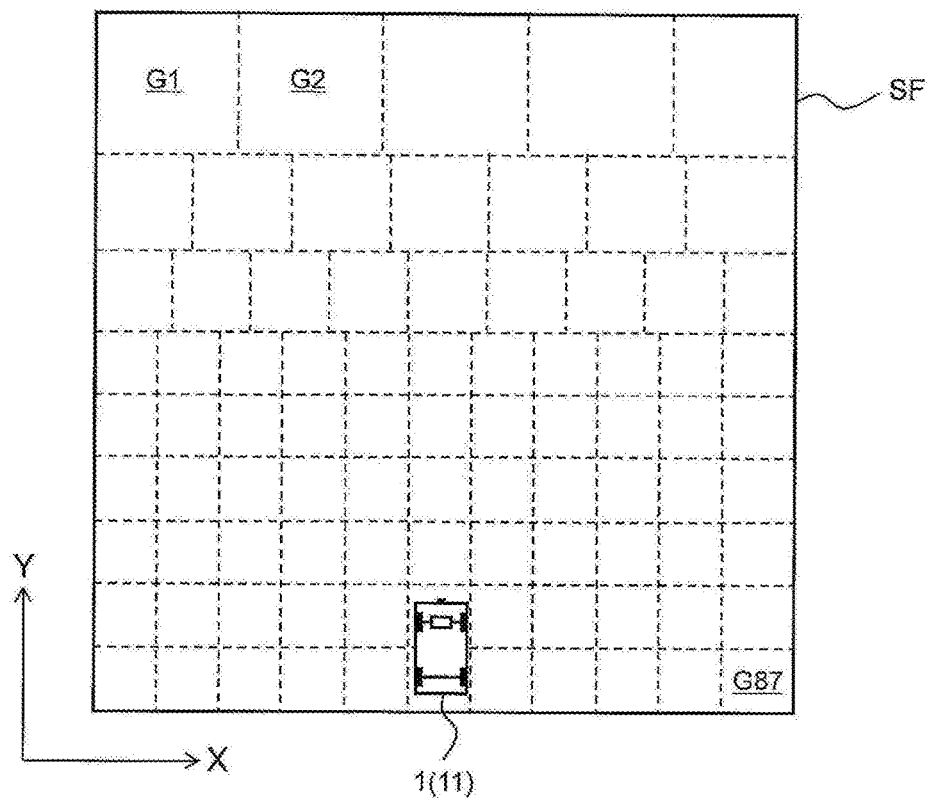
FIG. 4 is a diagram schematically illustrating an example of a state in which a reference plane is segmented into segmented regions.

The control unit 15 includes a road surface shape determining unit 155. The road surface shape determining unit 155 estimates the surface shape for each of the segmented regions using the road surface information I included in the segmented region. Thus, the road surface shape determining unit 155 can determine the shape of a part or all of the road surface RS. In the embodiment, for example, as illustrated in FIG. 4, the reference plane SF is segmented into a plurality of square segmented regions G1 to G87. FIG. 4 is a diagram schematically illustrating an example of a state in which the reference plane is segmented into segmented regions.

Each of the segmented regions G1 to G87 can be defined by, for example, center coordinates of the segmented region and a size of the segmented region. For example, when the center coordinates of the pth segmented region Gp is (XGp, YGp) (a fixed value determined on the reference plane SF in advance) and the size of the segmented region Gp is W, the segmented region Gp can be defined as a region represented by two inequalities including $XGp-W/2 \leq X < XGp+W/2$ and $YGp-W/2 \leq Y \leq YGp+W/2$.

The center coordinates of each segmented region and the size of each segmented region are stored in the storage unit 151 as segmented region information GI.

Since the object detection sensor 14 (detection surface DS) is attached to the main body 11 toward the road surface RS, a density of measurement points of the road surface RS present at a position far in a straight traveling direction from the main body 11 is smaller than a density of the measurement points of the road surface RS present at a position closer to the main body 11.

Therefore, in the embodiment, the sizes of the segmented regions G1 to G87 are determined on the basis of a distance between the object detection sensor 14 and the segmented region in the reference plane SF. Specifically, as illustrated in FIG. 4, sizes of the segmented regions present at positions far in a Y-axis direction (the straight traveling direction of the main body 11) from the main body 11 are greater than the sizes of the other segmented regions.

Thus, by increasing the sizes of the segmented regions present at the positions far in the straight traveling direction from the main body 11, it is possible to include more pieces of road surface information I in the respective segmented regions. Since the distance is changed according to the movement of the main body 11, the sizes of the segmented regions may be appropriately reviewed using the position change information of the main body 11.

Alternatively, the sizes of the segmented regions G1 to G87 may be the same in all the regions regardless of the above. Accordingly, it is not necessary to change the sizes of the segmented regions (the central coordinates are fixed) as the main body 11 moves.

The size, the number, the shape, or the like of the respective segmented regions can be appropriately changed in consideration of characteristics of the object detection sensor 14, an attachment state of the object detection sensor 14 to the main body 11, and the like.

Further, the road surface shape determining unit 155 performs fitting of a predetermined function to the road surface information I included in the segmented region, and estimates the surface shape function F calculated as a result of the fitting as a function indicating the surface shape of the road surface RS present in the segmented region. Accordingly, the surface shape of the road surface RS can be represented by a mathematical model such as the surface shape function F that is matched with the road surface information I.

In the embodiment, the road surface shape determining unit 155 uses a first shape function F1 and a second shape function F2 as a predetermined function to be fitted to the road surface information I included in the segmented region. The road surface shape determining unit 155 estimates that the shape function further matches the road surface information I included in the segmented region among the first shape function F1 and the second shape function F2 is the surface shape function F that represents the surface shape of the segmented region. Accordingly, the surface shape function F can be more simply determined by using the first shape function F1 and the second shape function F2 determined in advance.

The first shape function F1 and the second shape function F2 can be defined as functions representing a typical shape of the road surface RS as follows.

Figure 5A:
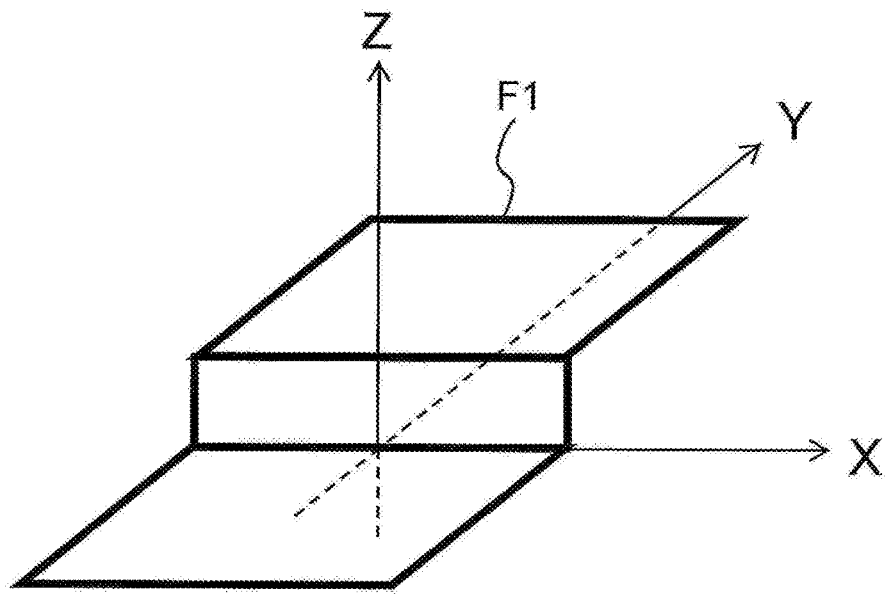
FIG. 5A is a diagram illustrating an example of a first shape function.

As illustrated in FIG. 5A, the first shape function F1 can be defined as a function representing a step of the road surface RS in a real space coordinate system (an XYZ coordinate system). FIG. 5A is a diagram illustrating an example of the first shape function. The first shape function F1 illustrated in FIG. 5A can be expressed by, for example, three surfaces including a surface $Z=a$ ($-X1 \leq X \leq X1$, $0 \leq Y \leq Y1$), a surface $Y=0$ ($-X1 \leq X \leq X1$, $b \leq Z \leq a$), and a surface $Z=b$ ($-X1 \leq X \leq X1$, $-Y1 \leq Y \leq 0$) (X1: a value indicating a boundary in the X axis direction of the segmented region, and Y1: a value indicating a boundary in the Y axis direction of the segmented region).

When the first shape function F1 is fitted to the road surface information I, a height of the step of the first shape function F1 or a height from the reference plane (surface $Z=0$) can be changed by changing the values a and b. Further, a direction of the step can be changed, for example, by rotating the first shape function F1 illustrated in FIG. 5A around the Z axis. Further, a position of the step in the segmented region can be changed, for example, by moving the surface $Y=0$ (a surface parallel to the X-Z plane) in the Y axis direction. Further, an arbitrary first shape function F1 can be generated by rotating each surface around an arbitrary axis or by shifting the surface.

Alternatively, the first shape function F1 representing the step can be defined as a single continuous surface by a function representing a step, such as a sigmoid function.

Figure 5B:
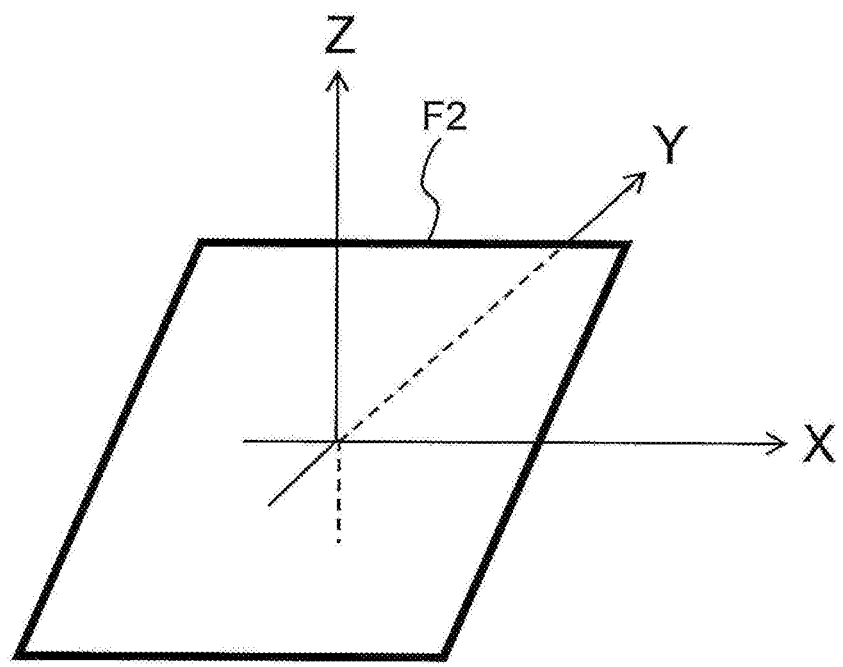
FIG. 5B is a diagram illustrating an example of a second shape function.

Meanwhile, as illustrated in FIG. 5B, the second shape function F2 can be defined as a function representing an inclined plane (or a plane without inclination) in the road surface RS. FIG. 5B is a diagram illustrating an example of the second shape function. Since the second shape function F2 can be represented by one surface and can be defined as, for example, a surface passing through coordinates (X0, Y0, Z0) in the segmented region and having a normal vector of (c, d, e), such as $c*(X-X0)+d*(Y-Y0)+e*(Z-Z0)=0$ ($-X1 \leq X \leq X1$, $-Y1 \leq Y \leq Y1$).

When the second shape function F2 is fitted to the road surface information I, an arbitrary second shape function F2 can be generated by appropriately changing a value of the normal vector of the second shape function F2 and/or a coordinate point through which the second shape function F2 passes.

The control unit 15 includes a road surface state determining unit 156. The road surface state determining unit 156 determines a road surface state of the road surface RS on the basis of the surface shape estimated by the road surface shape determining unit 155. Specifically, when there is no first shape function F1 and second shape function F2 matching the road surface information I included in the segmented region and the surface shape function F cannot be determined as a result of fitting using the first shape function F1 and the second shape function F2, the road surface state determining unit 156 determines that there is an obstacle other than the road surface RS in the segmented region.

Further, for example, road surface state determining unit 156 may determine that there is an obstacle in the segmented region even when a normal vector of the second shape function F2 is calculated as a vector substantially parallel to the X axis and/or the Y axis (for example, when an absolute value of the X axis direction component (a c value) of the normal vector and/or a Y axis direction component (a d value) of the normal vector is much greater than an absolute value (an e value) of the Z axis direction component of the normal vector), and the road surface information I having a very great Z coordinate value is included in the second shape function F2 representing the inclined plane of the road surface RS.

Further, the road surface state determining unit 156 may refer to the surface shape function F determined in each of the segmented regions and determine that there is the road surface RS that the main body 11 cannot pass when there is a step or an inclined plane such that the main body 11 cannot pass in the segmented region in a direction in which the main body 11 is about to move.

For example, in the surface shape function F represented by the first shape function F1, when there is a surface that is very high or low from the reference plane SF among the three surfaces, the road surface state determining unit 156 can determine that there is a step such that the main body 11 cannot pass on the road surface RS. Alternatively, in the surface shape function F represented by the second shape function F2, when the X-axis direction component (the c value) and/or the Y-axis direction component (the d value) of the normal vector is much greater than the Z-axis direction component (the e value), the road surface state determining unit 156 can determine that there is an inclined plane with a large angle with respect to the reference plane SF on the road surface RS.

When the road surface state determining unit 156 determines that there is an obstacle and/or the road surface RS that the main body 11 cannot pass in the direction in which the main body 11 is about to move, the road surface state determining unit 156 outputs, for example, an abnormality alarm for displaying a result of the determination to a display (for example, a part of a map display screen of a GPS device) included in the moving body system 1. Further, an abnormality warning for lighting a lamp or the like may be output to the moving body system 1. Accordingly, the driver of the moving body system 1 can visually recognize that there is the obstacle, or the road surface RS that the main body 11 cannot pass near the main body 11.

Further, the road surface state determining unit 156 also outputs the abnormality warning to a movement control unit 157 to be described below.

The control unit 15 has a movement control unit 157. When the movement control unit 157 receives the abnormality warning from the road surface state determining unit 156, the movement control unit 157 outputs a movement control signal for controlling, for example, the brake drive mechanism, a drive mechanism of the drive unit 13, and/or a drive mechanism of a steering wheel to control the moving body system 1 on behalf of the driver of the moving body system 1, as necessary.

For example, when the movement control unit 157 receives the abnormality warning, the movement control unit 157 moves the main body 11 in a direction for avoiding the segmented region in which there is the obstacle, or the road surface RS that the main body 11 cannot pass, or outputs a movement control signal for stopping the main body 11 in front of the segmented region.

Thus, the moving body system 1 can prevent the moving body system 1 (the main body 11) from being damaged due to collision with the obstacle or passage of the road surface RS that the main body 11 cannot pass.

With the above configuration, the control unit 15 can appropriately recognize the road surface shape with a smaller amount of calculation, as compared with a case in which the shape of the entire road surface RS is determined using all of the road surface information I acquired in the entire reference plane SF. As a result, a processing speed for calculation of the road surface shape can be improved. For example, before the main body 11 passes the region to be avoided, the road surface shape can be appropriately recognized and a command to avoid the region can be output to the body system 1.

Figure 6:
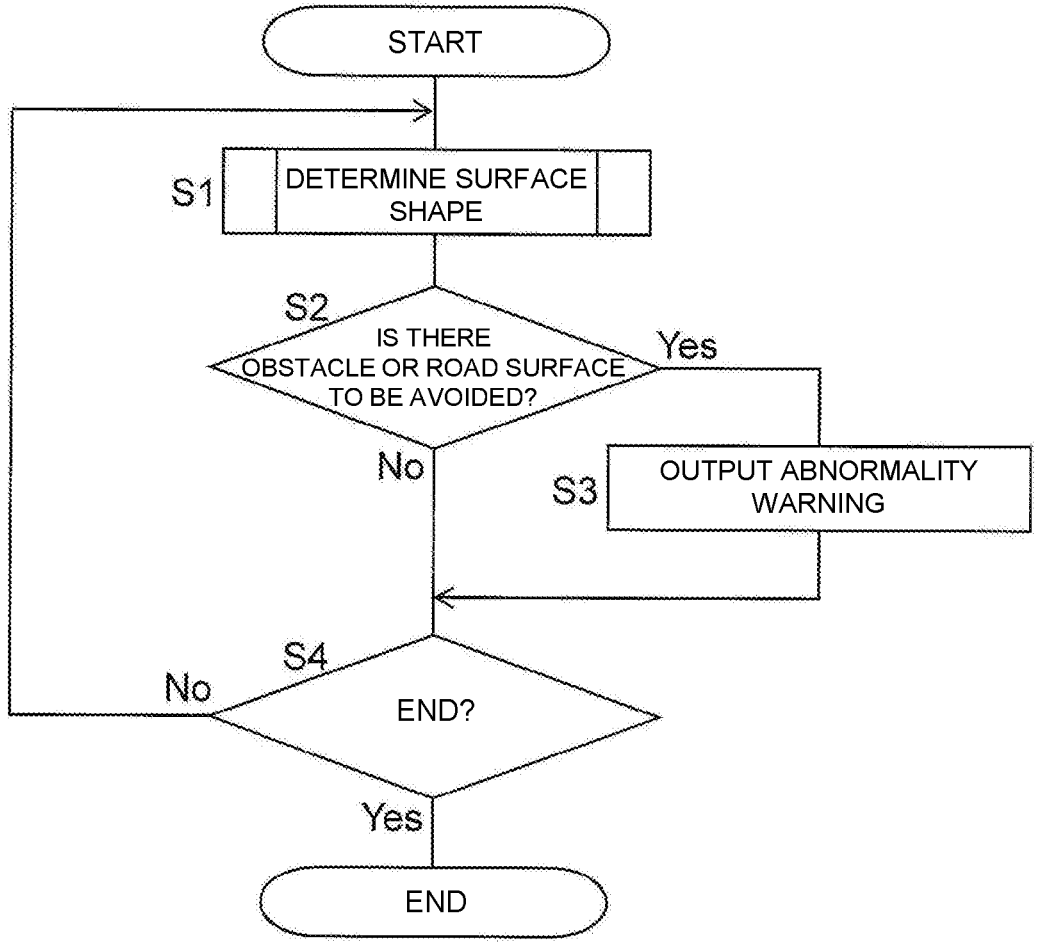
FIG. 6 is a flowchart illustrating an overall operation of the road surface shape measuring device.

(4) Operation of Road Surface Shape Measuring Device (4-1) Overall Operation of Road Surface Shape Measuring Device Hereinafter, an operation of the road surface shape measuring device 100 included in the moving body system 1 will be described. First, the overall operation of the road surface shape measuring device 100 will be described with reference to FIG. 6. FIG. 6 is a flowchart illustrating the overall operation of the road surface shape measuring device.

First, the control unit 15 determines a shape of the road surface RS on which the main body 11 is moving (step S1). Specifically, the control unit 15 determines the shape of a part or all of the road surface RS as a mathematical model by determining the surface shape function F for each of a plurality of predetermined segmented regions in the reference plane SF. A process of determining the shape of the road surface RS in step S1 will be described in detail below.

After the shape of the road surface RS is determined, the road surface state determining unit 156 determines a state of the road surface RS on which the main body 11 is about to move (step S2).

When there is a surface shape function F representing an obstacle, a large step, and/or a steep inclined plane in the segmented region in the direction in which the main body 11 is about to move, that is, there is an obstacle or a road surface to be avoided in the direction in which the main body 11 is about to move with reference to the surface shape function F of each segmented region determined in step S1 ("Yes" in step S2), the road surface state determining unit 156 outputs the abnormality warning (step S3).

By outputting the abnormality warning, for example, presence of an obstacle or a road surface to be avoided in the direction in which the main body 11 is about to move can be displayed on a display or the like included in the moving body system 1. As a result, it is possible to visually notify the driver of the moving body system 1 of the presence of the obstacle or the road surface to be avoided.

When the abnormality warning is output, the movement control unit 157 outputs a movement control signal for controlling a break drive mechanism, a drive mechanism of the drive unit 13, a drive mechanism of a handle, and/or the like, as necessary, to control the movement of the moving body system 1 so that the main body 11 does not collide with the obstacle and/or does not pass the road surface to be avoided.

On the other hand, when the road surface state determining unit 156 determines that there is no obstacle or road surface to be avoided in the segmented region in the direction in which the main body 11 is about to move ("No" in step S2), the road surface state determining unit 156 does not output an abnormality warning. Accordingly, the driver of the moving body system 1 can determine that there is no problem even when the driver passes through the direction in which the main body 11 is about to move. As a result, the moving body system 1 can continue to move according to an operation of the driver.

After steps S1 to S3 are executed, the process returns to step S1 and the road surface shape measuring device 100 continues to operate as long as the driver of the moving body system 1 or the like does not instruct to stop the operation of the road surface shape measuring device 100 ("No" in step S4).

On the other hand, when the driver of the moving body system 1 or the like instructs to stop the operation of the road surface shape measuring device 100 ("Yes" in step S4), the road surface shape measuring device 100 stops its operation.

By executing steps S1 to S4 above, when there is an obstacle or a road surface to be avoided in the direction in which the main body 11 is about to move, it is possible to warn against the presence of the obstacle or the road surface. As a result, the moving body system 1 can be controlled, for example, not to collide with an obstacle or pass through a road surface through which the main body 11 cannot pass, as necessary.

(4-2) Road Surface Shape Determination Process

Figure 7:
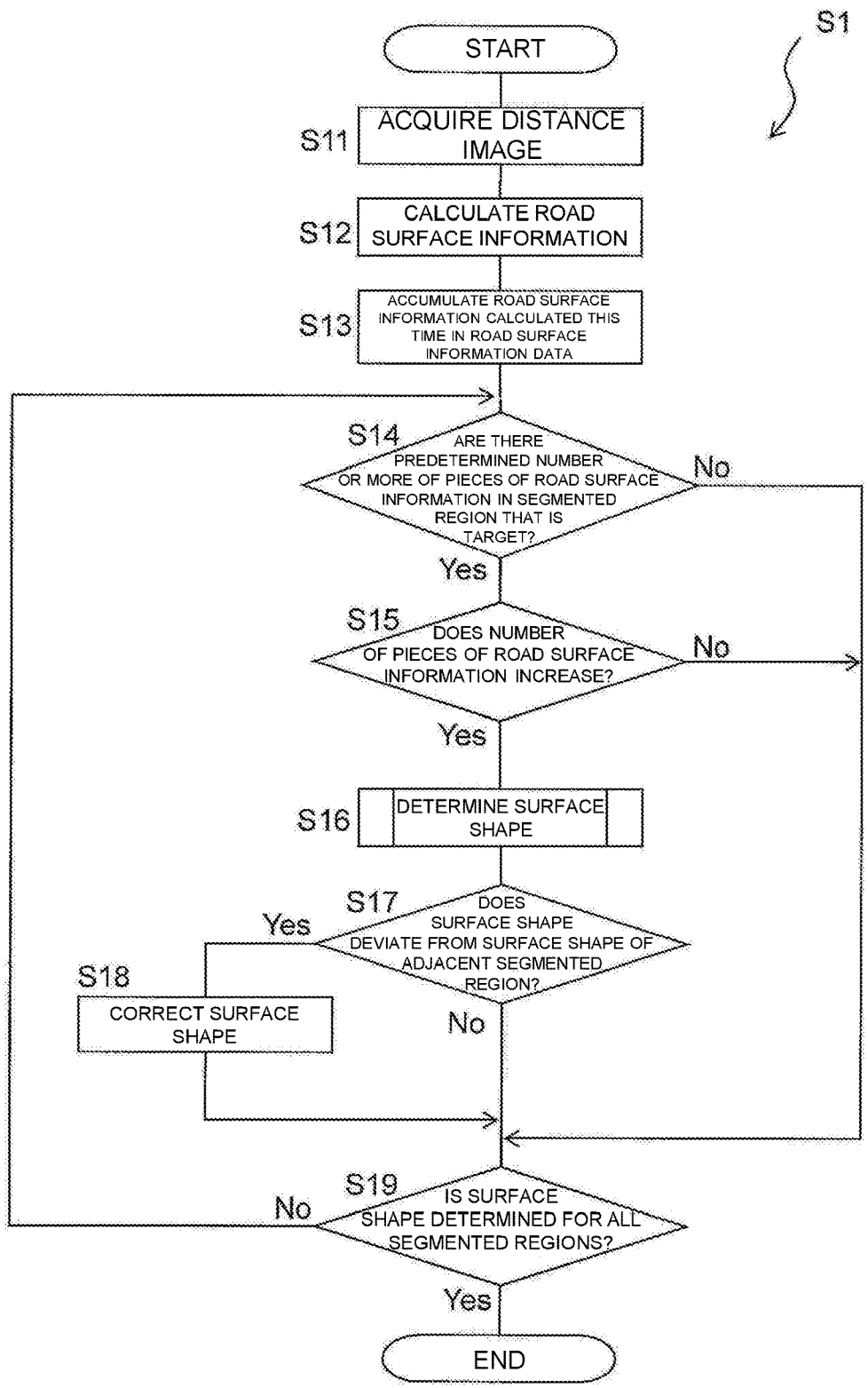
FIG. 7 is a flowchart illustrating a flow of a road surface shape determination process.

Then, the road surface shape determination process that is executed in step S1 will be described with reference to FIG. 7. FIG. 7 is a flowchart illustrating a flow of the road surface shape determination process.

When the road surface shape determination process is started, first, the road surface information acquisition unit 14' acquires the road surface information I that is used to determine the shape of the road surface RS. Specifically, the road surface information I is acquired as follows.

First, the distance image acquisition unit 152 acquires the sets (x1, y1, d1), (x2, y2, d2), . . . , (xn, yn, dn) of the n pieces of first position information (pixels) as the distance image D1 and stores the sets in the storage unit 151 (step S11).

After the distance image D1 is acquired, the coordinate transformation unit 153 transforms the n pieces of first position information included in the distance image D1 into coordinate values of a real space coordinate system (an XYZ coordinate system) in which the main body 11 moves, to calculate the road surface information I (step S12). Hereinafter, a specific method of converting the first position information into the coordinate value of the real space coordinate system, in which the first position information (xp, yp, dp) is used as an example, will be described.

The coordinate transformation unit 153 first acquires the position on the reference plane SF of the main body 11 from the position determining unit 154. The coordinate transformation unit 153 calculates the position of the object detection sensor 14 in the reference plane SF by taking an attachment position of the object detection sensor 14 to the main body 11 into consideration as well as the position on the reference plane SF of the main body 11. For example, it is assumed that the position of the object detection sensor 14 on the reference plane SF is calculated as (Xs1, Ys1).

Then, the coordinate transformation unit 153 associates a coordinate value (xp, yp) of the first coordinate of the first position information (xp, yp, dp) with the position (coordinate value) on the reference plane SF. The relative position of the reference plane SF corresponding to the coordinate value (xp, yp) of the first coordinates with respect to the object detection sensor 14 (in other words, the position (coordinate value) of the first coordinates on the reference plane SF corresponding to a predetermined coordinate value when an origin of the reference plane SF is the object detection sensor 14) is associated in advance by calibration on the basis of the arrangement position on the detection surface DS of the detection unit corresponding to the coordinate value (xp, yp) of the first coordinate.

For example, it is assumed that a relative position of the reference plane SF corresponding to the coordinate value (xp, yp) is associated with the coordinate value (Xp, Yp).

Thereafter, the coordinate transformation unit 153 can calculate the position on the reference plane SF corresponding to the coordinate value (xp, yp) of the first coordinates as the road surface position (Xp+Xs1, Yp+Ys1) by adding the coordinate value (Xp, Yp) to the position (Xs1, Ys1) on the reference plane SF of the object detection sensor 14 determined by the position determining unit 154.

Then, the coordinate transformation unit 153 can calculate the road surface height (Z coordinate value) which is a height of the road surface RS present at the road surface position (Xp+Xs1, Yp+Ys1) from the reference plane SF using the distance dp that is the pixel value of the distance image D1 as follows.

First, since the distance between the road surface RS present at the road surface position (Xp+Xs1, Yp+Ys1) and the detection unit (the object detection sensor 14) is dp, the coordinate transformation unit 153 can calculate the height of the detection unit (the object detection sensor 14) viewed from the road surface RS as sqrt $\{dp^2-(Xp^2+Yp^2)\}$ (sqrt { }: a square root of the numerical value in { }).

Then, the coordinate transformation unit 153 can calculate a road surface height Zp of the road surface RS present at the road surface position (Xp+Xs1, Yp+Ys1) as Zp=Zs1+ H−sqrt $\{dp^2-(Xp^2+Yp^2)\}$ from the height calculated as described above, the height H between the object detection sensor 14 and the road surface RS immediately below the object detection sensor 14, and a road surface height Zs1 of the road surface RS at the road surface position (Xs1, Ys1).

The height H is a constant value that is determined by the attachment position of the object detection sensor 14 to the main body 11. Further, since the road surface information I at the position (Xs1, Ys1) or the closest position has been acquired before the main body 11 reaches the position (Xs1, Ys1), the road surface height Zs1 at the road surface position (Xs1, Ys1) is known at a point in time at which the road surface height Zp is calculated.

As described above, for one piece of first position information (one pixel of the distance image D1), one piece of road surface information including a road surface position corresponding to the first position information (pixel) and a road surface height which is a height from the reference plane SF of the road surface RS at the road surface position can be calculated.

By executing the coordinate transformation for each of the n pieces of first position information (x1, y1, d1) to (xn, yn, dn) included in the distance image D1, the coordinate transformation unit 153 can calculate a plurality of (n) pieces of road surface information I-1 to I-n for a plurality of (n pieces) points on the road surface RS.

After the road surface information I-1 to I-n are calculated, the road surface information acquisition unit 14' accumulates the road surface information I-1 to I-n calculated this time in the road surface information calculated up to the previous road surface shape determination process (step S13). Specifically, the road surface information acquisition unit 14' adds the road surface information I-1 to I-n calculated this time to the road surface information data D2 generated by accumulating the road surface information calculated up to the preceding time and stored in the storage unit 151. Accordingly, the road surface information acquisition unit 14' can accumulate the road surface information I measured at different times (each time the road surface shape determination process is executed).

When the road surface information I is accumulated, the reference coordinates may be updated each time. In this case, correction may be performed on the road surface information data D2 before the addition using the position change information obtained from the position measurement unit 16 in consideration of the movement of the main body 11, and then, the road surface information I-1 to I-n calculated this time may be added.

Figure 8A:
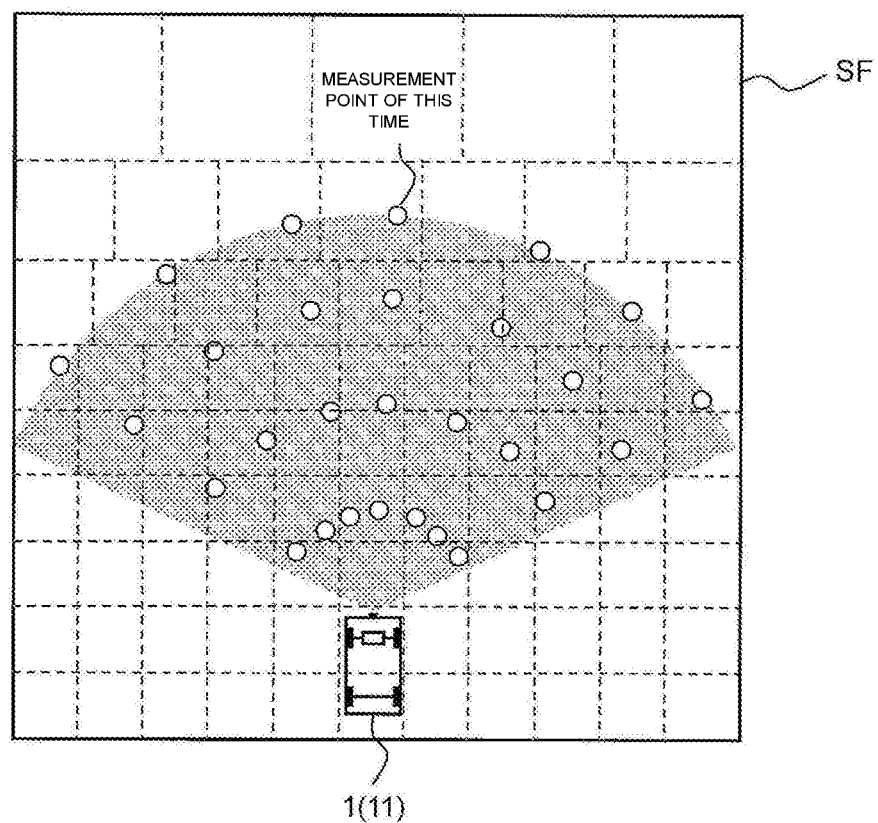
FIG. 8A is a diagram schematically illustrating an example of a state in which road surface information is accumulated (part 1).
Figure 8B:
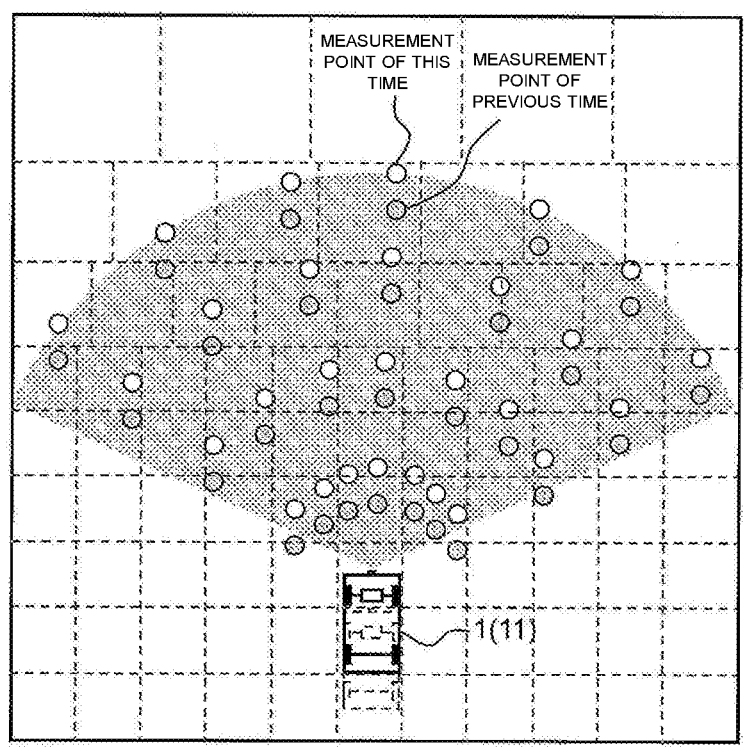
FIG. 8B is a diagram schematically illustrating an example of a state in which road surface information is accumulated (part 2).
Figure 8C:
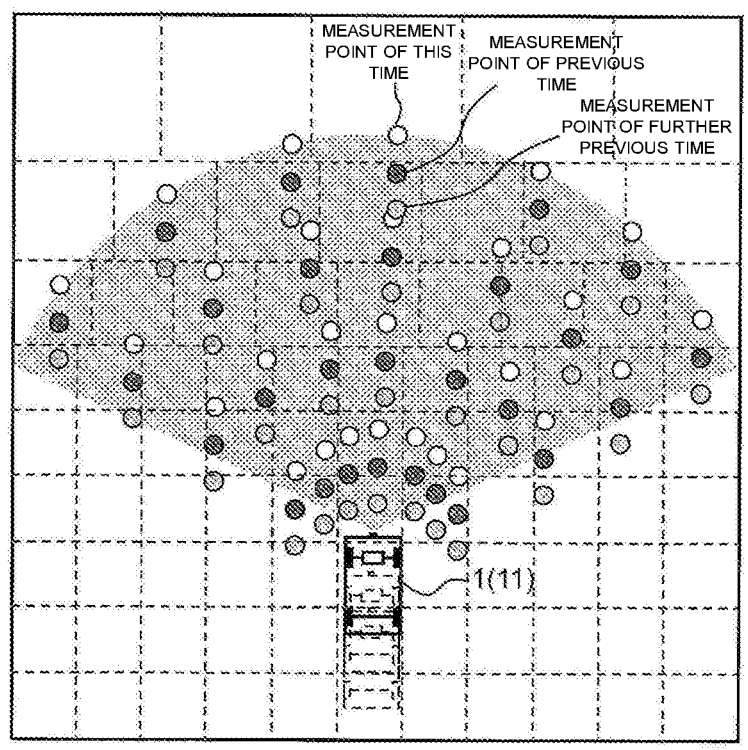
FIG. 8C is a diagram schematically illustrating an example of a state in which road surface information is accumulated (part 3).

As described above, by accumulating the pieces of road surface information acquired at different times, the number of measurement points (that is, the road surface information I) of the road surface RS included in the respective segmented regions G1 to G87 can be increased as the main body 11 moves in the straight traveling direction (the Y-axis direction), as illustrated in FIGS. 8A to 8C. FIGS. 8A to 8C are diagrams schematically illustrating an example of a state in which the road surface information is accumulated.

After the road surface information I-1 to I-n are accumulated in the road surface information data D2, the road surface shape determining unit 155 estimates the surface shape of the road surface RS for each segmented region using the road surface information I included in the respective segmented regions G1 to G87. When the surface shape for each segmented region is estimated, the segmented region from which the estimation of the surface shape is started can be arbitrarily determined. For example, the surface shape can be estimated from the segmented region including a large number of pieces of road surface information I in consideration of the fact that the surface shapes of the segmented regions adjacent to each other are corrected to be continuous. Accordingly, a more accurate surface shape can be first estimated using the large number of pieces of road surface information I, and then, the calculated surface shape can be connected to the accurate surface shape that has been first estimated. That is, the surface shape calculated later can be connected to the accurate surface shape.

However, an order of the segmented regions in which the surface shape is estimated is not limited to the above order. For example, the surface shape may be estimated sequentially from the segmented region G1 to the segmented region G87, or the surface shape may be estimated in a reverse order.

Hereinafter, a method of estimating the surface shape of the road surface RS in the segmented region Gp in an example in which the pth segmented region Gp is estimated will be described.

The road surface shape determining unit 155 first refers to the road surface information data D2 stored in the storage unit 151 to determine whether or not a predetermined number or more of pieces of road surface information I are included in the segmented region Gp (step S14).

Specifically, the road surface shape determining unit 155 determines the road surface information I in which the X coordinate value and the Y coordinate value are within ranges of $XGp-W/2 \leq X < XGp+W/2$ and $YGp-W/2 \leq Y \leq YGp+W/2$, respectively, among the pieces of road surface information I included in the road surface information data D2 to be the road surface information I included in the segmented region Gp. The road surface shape determining unit 155 counts the number of pieces of road surface information I determined as described above and determines whether or not the counted number of pieces of road surface information I is equal to or larger than a predetermined number.

The predetermined number can be the smallest number of pieces of road surface information I necessary to determine the surface shape of the segmented region Gp. In the embodiment, since the surface shape of the segmented region Gp is estimated using a three-dimensional mathematical model (the first shape function F1 and the second shape function F2), 3 is selected as the predetermined number.

When only the pieces of road surface information I of which the number is smaller than the predetermined number have been determined to be included in the segmented region Gp, which is a target in which the surface shape is to be estimated ("No" in step S14), the road surface shape determining unit 155 determines that the surface shape is not estimated in the segmented region Gp, and the process proceeds to step S18.

On the other hand, when the predetermined number or more of pieces of road surface information I have been determined to be included in the segmented region Gp ("Yes" in step S14), the road surface shape determining unit 155 determines that the surface shape is estimated in the segmented region Gp.

As described above, the surface shape of the road surface RS can be appropriately estimated at a timing when the number of pieces of road surface information I enough to estimate an appropriate surface shape is collected by determining the surface shape is not estimated when the number of pieces of road surface information I included in the segmented region Gp is smaller than the predetermined number, whereas determining the surface shape is estimated when the number of pieces of road surface information I included in the segmented region Gp is equal to or greater than the predetermined number.

After the surface shape in the segmented region Gp is determined to be estimated, the road surface shape determining unit 155 further determines whether the number of pieces of road surface information I included in the segmented region Gp increases as compared with the number when the surface shape function F has been previously determined (step S15).

When the surface shape function F has already been determined as the surface shape in the segmented region Gp, but the number of pieces of road surface information I included in the segmented region Gp has not increased as compared with the number when the surface shape function F has been estimated ("No" in step S15), the road surface shape determining unit 155 deterr lines that it is not necessary to update the previously determined surface shape function F, and the process proceeds to step S18.

On the other hand, when the surface shape function F has not been determined in the segmented region Gp, or the surface shape function F has already been determined, but the number of pieces of road surface information I included in the segmented region Gp has increased as compared with the number when the surface shape function F has been estimated ("Yes" in step S15), the road surface shape determining unit 155 determines to estimate the surface shape function F or to update the previous estimated surface shape function F (step S16).

By determining to update the previously determined surface shape function F using the number of pieces of road surface information I larger than the number of pieces of road surface information I used to determine the surface shape function F, a more appropriately estimated surface shape can be determined as a true surface shape of the road surface RS.

Figure 9:
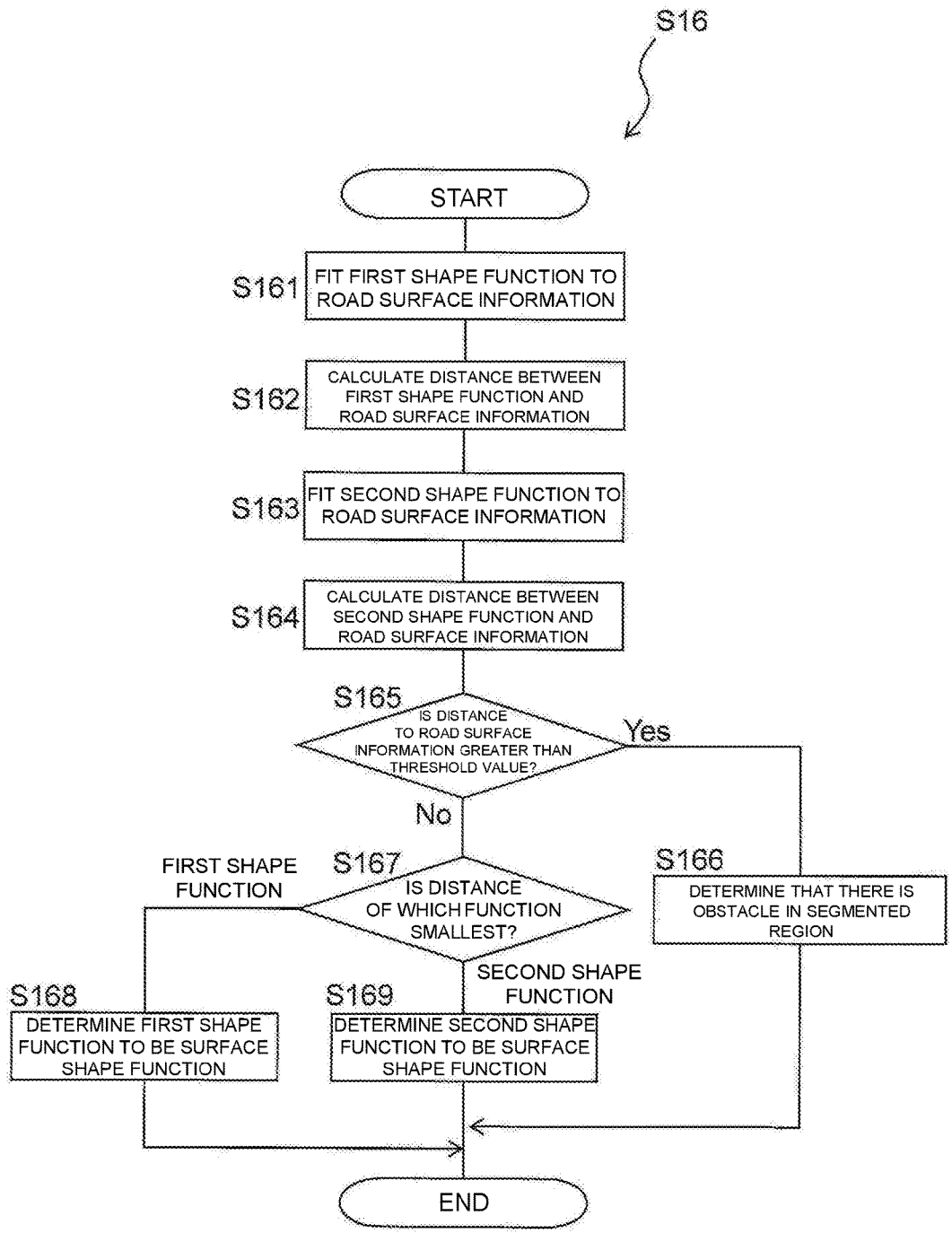
FIG. 9 is a flowchart illustrating a flow of a process of determining a surface shape.

In step S16, the road surface shape determining unit 155 performs fitting of the first shape function F1 and the second shape function F2 to the road surface information I included in the segmented region Gp, to determine the shape of the road surface RS of the segmented region Gp. More specifically, the surface shape of the road surface RS in the segmented region Gp is determined by a flow of a process shown in a flowchart of FIG. 9. FIG. 9 is a flowchart illustrating a flow of a process of determining the surface shape.

First, the road surface shape determining unit 155 fits the first shape function F1 to the road surface information I included in the segmented region Gp (step S161). For example, for the surface Z=a ($-X1 \leq X \leq X1$, $0 \leq Y \leq Y1$) and the surface Z=b ($-X1 \leq X \leq X1$, $-Y1 \leq Y \leq 0$), the value a and/or the value b with which the distance to the road surface information I included in the segmented region Gp is minimized can be calculated using a least squares method or the like. Further, for the surface Y=0 ($-X1 \leq X \leq X1$, $b \leq Z \leq a$), the surface Y=f (f: arbitrary number) obtained by shifting the surface Y=0 in a Y-axis direction, with which the distance to the road surface information I included in the segmented region Gp is minimized, can be calculated using a least squares method or the like.

Further, after the three faces are rotated as necessary, arbitrary three faces are determined using a least squares method or the like.

Fitting can also be performed using a method of creating an error function by summing the distances between the respective points on the road surface RS and the surface shape over the road surface information I, and minimizing the error function using a steepest descent method or the like, in addition to the use of the least squares method. In this case, a, b, f, and the amount of rotation are the parameters.

After the first shape function F1 is determined as described above, the road surface shape determining unit 155 determines the sum of the distances between the determined first shape function F1 and the road surface information I included in the segmented region Gp using, for example, a formula for calculating the distance between the three-dimensional surface and the point (step S162).

Then, the road surface shape determining unit 155 fits the second shape function F2 to the road surface information I included in the segmented region Gp (step S163). For example, the second shape function F2 in which the distance to the road surface information I included in the segmented region Gp is minimized can be calculated by applying the least squares method to a surface $c*(X-X0)+d*(Y-Y0)+e*(Z-Z0)=0$ ($-X1 \leq X \leq X1$, $-Y1 \leq Y \leq Y1$) representing the second shape function F2.

The application of the least-squares method to the surface $c*(X-X0)+d*(Y-Y0)+e*(Z-Z0)=0$ can be executed, for example, as follows.

First, the second shape function F2 is determined to be $c*(X-X0')+d*(Y-Y0')+e*(Z-Z0')=0$ (coordinates (X0', Y0', Z0'): a centroid of the road surface information I included in the segmented region Gp) on the assumption that the surface representing the second shape function F2 passes through a centroid of the road surface information I included in the segmented region Gp.

Then, the final second shape function F2 can be determined by calculating a value of each element of the normal vector (c, d, e) in which a sum of squares of distances between the second shape function F2 and the road surface information I included in the segmented region Gp is minimized using a Lagrange's undetermined multiplier method or the like. When the second shape function F2 is determined using the least squares method, the normal vector (c, d, e) may be assumed as a unit vector (a vector with a length of 1) in order to simplify the calculation.

After the second shape function F2 is determined as described above, the road surface shape determining unit 155 calculates a sum of the distances between the determined second shape function F2 and the road surface information I included in the segmented region Gp using, for example, a formula for calculating a distance between a three-dimensional surface and a point (step S164).

When the first shape function F1 and the second shape function F2 are determined using the least squares method in steps S161 and S163 above, the first shape function F1 and the second shape function F2 may be determined by focusing on road surface information I of which the acquisition time is newer among the pieces of road surface information I included in the segmented region Gp.

For example, the first shape function F1 and the second shape function F2 may be determined using a plurality of pieces of road surface information I selected so that the number of new pieces of road surface information I is larger than the number of old pieces of road surface information I. Accordingly, it is possible to estimate a more appropriate surface shape of the road surface RS of the segmented region Gp using the road surface information I with high reliability by the object detection sensor 14 further approaching the segmented region Gp.

Thereafter, the road surface shape determining unit 155 determines whether any one of the sum of the distances between the determined first shape function and the road surface information I and the sum of the distances between the second shape function and the road surface information I satisfy a threshold value (step S165).

When the previously determined surface shape function F is not present and the two sums of the distances are both greater than the threshold value ("Yes" in step S165), the road surface shape determining unit 155 determines that there is an obstacle having a shape that is not fitted to both the first shape function F1 and the second shape function F2 in the segmented region Gp (step S166), and ends the surface shape determination process.

On the other hand, when one or both of the two sums of the distances are equal to or smaller than the threshold value ("No" in step S165), the road surface shape determining unit 155 determines that the first shape function F1 is the surface shape function F of the segmented region Gp in a case in which the sum of distances of the first shape function F1 is smallest (in the case of the "first shape function" in step S167) (step S168).

On the other hand, in a case in which the sum of the distances of the second shape function F2 is smallest (in the case of the "second shape function" in step S167), the road surface shape determining unit 155 determines that the second shape function F2 is the surface shape function F of the segmented region Gp (step S169).

In a case in which the surface shape function F has been already present, when the sum of the distances between the surface shape function F that has been already present and the road surface information I included in the segmented region Gp is smallest, the road surface shape determining unit 155 maintains the surface shape function F has been already present, as a function representing the surface shape of the segmented region Gp.

By executing steps S161 to S169 above, the road surface shape determining unit 155 can relatively simply determine the shape function further matching the road shape information I included in the segmented region Gp among the first shape function F1 and the second shape function that have been determined in advance, to be the surface shape function F representing the surface shape of the road surface RS of the segmented region Gp using a mathematical model.

After the road surface shape determining unit 155 determines the surface shape (the surface shape function F) as described above, the road surface shape determining unit 155 determines whether or not the determined surface shape function F deviates from the surface shape function F determined in the segmented region adjacent to the segmented region Gp (step S17).

For example, when the surface shape function F in the segmented region Gp is greatly different from the surface shape function in the adjacent segmented region on a boundary line between the segmented region Gp and the adjacent segmented region, the road surface shape deteinining unit 155 determines that the surface shape function F determined in the segmented region Gp and the surface shape function determined in the segmented region adjacent to the segmented region Gp are discontinuous.

When the surface shape function F determined in the segmented region Gp and the surface shape function determined in the segmented region adjacent to the segmented region Gp are discontinuous ("Yes" in step S17), the road surface shape determining unit 155 corrects the surface shape function F of the segmented region Gp so that the surface shape function F determined in the segmented region Gp is continuously connected to the surface shape function determined in the adjacent segmented region (step S18).

Specifically, for example, several coordinate points that the surface shape function of the segmented region adjacent through the boundary line of the segmented region Gp can take on the boundary line are set on the boundary line of the segmented region Gp, and the surface shape function F is determined again by fitting in the segmented region Gp to necessarily pass through the coordinate points. The road surface shape determining unit 155 determines that the surface shape function F that has been determined again to be a the surface shape function representing the surface shape of the road surface RS of the segmented region Gp, and stores the surface shape function F in the storage unit 151.

By correcting the surface shape function F in the segmented region Gp as described above, when contradiction arises between a plurality of surface shapes estimated in the adjacent segmented regions, the contradiction can be eliminated and an appropriate surface shape in each segmented region can be estimated.

On the other hand, when the surface shape function F determined in the segmented region Gp is continuously connected to the surface shape function determined in the segmented region adjacent to the segmented region Gp ("No" in step S17), the road surface shape determining unit 155 determines the surface shape function F determined this time to be a surface shape function representing the surface shape of the road surface RS of the segmented region Gp, and stores the surface shape function F in the storage unit 151.

When there is still the segmented region for which the surface shape function F is to be determined ("No" in step S19) after the surface shape function F of the segmented region Gp is determined, the road surface shape determination process returns to step S14, executes steps S14 to S17 above for all the segmented regions G1 to G87, and determines the surface shape function F when possible.

On the other hand, when the segmented region Gp is the last segmented region for which the surface shape function F is to be determined and steps S14 to S17 above have been executed in all the segmented regions G1 to G87 ("Yes" in step S19), the road surface shape determination process ends.

Thus, in the road surface shape measuring device 100 according to the embodiment, the surface shape (that is, a shape of a part of the road surface RS) is estimated for each of the segmented regions G1 to G87 using the road surface information I included in each of the segmented regions G1 to G87. That is, the surface shape of the road surface RS in a narrow region is estimated using a relatively small number of pieces of road surface information I included in the narrow region. By estimating the surface shape (the surface shape function F) of the narrow region using a small number of pieces of road surface information I, particularly, the amount of calculation (the number of times of calculations) until the surface shape function F is determined can be greatly reduced, as compared with a case in which a surface shape of a wide range such as the entire reference plane SF is estimated using a large number of pieces of road surface information I.

That is, the road surface shape can be appropriately recognized with a smaller amount of calculation, as compared with the case in which the shape of the entire road surface is determined using all of pieces of the road surface information I acquired in the entire reference plane SF.

2. Other Embodiment

The embodiments of the present invention have been described above, but the present invention is not limited to the above embodiments, and various modifications can be performed without departing from the gist of the invention. In particular, the plurality of embodiments and modification examples described in this specification can be arbitrarily combined, as necessary.

For example, an order or a process of the respective processes in the road surface shape determination process described with reference to FIG. 7 and/or the respective processes in the surface shape determination process described with reference to FIG. 9 can be changed, as necessary.

(A) Another Embodiment of Correction of Surface Shape Function

For example, in the road surface shape determination process according to the first embodiment described above, when the surface shape function F is discontinuous with the surface shape function in the adjacent segmented region after the surface shape function F is first determined in step S16, the surface shape function F has been corrected.

Since the surface shape function F of the segmented region Gp may be continuously connected to the surface shape function determined in the segmented region adjacent to the segmented region Gp on the boundary line, the correction of the surface shape function F is not limited to the method described in the first embodiment.

For example, when the road surface information I included in the segmented region Gp is fitted to the first shape function F1 and the second shape function F2 (at the time of execution of steps S161 and S163 of the first embodiment), the surface shape function determined in the segmented region adjacent to the segmented region Gp includes the coordinate values that can be taken on the boundary line between the segmented region Gp and the adjacent segmented region, in addition to the road surface information I included in the segmented region Gp, and fitting of the first shape function F1 and the second shape function F2 is then executed. Thus, the surface shape function F continuously connected to the surface shape function determined in the adjacent segmented region can be calculated by one fitting.

(B) Another Embodiment of Method of Fitting First Shape Function and Second Shape Function to Road Surface Information In the first embodiment, the least squares method has been used as a method of calculating the first shape function F1 and the second shape function F2 matching the road surface information I included in the segmented region Gp. Other methods than the least squares method can be used as the method of calculating the first shape function F1 and the second shape function F2 matching the road surface information I included in the segmented region Gp.

For example, the first shape function F1 and the second shape function F2 matching the road surface information I included in the segmented region Gp can be calculated using a "RANdom Sample Consensus (RANSAC)" algorithm.

Specifically, the first shape function F1 and the second shape function F2 that match the road surface information I included in the segmented region Gp are calculated by executing the following steps.

(i) The minimum number of pieces of road surface information I necessary for determination of the first shape function F1 and the second shape function are selected from the road surface information I included in the segmented region Gp.

(ii) The first shape function F1 and the second shape function F2 are calculated using the road surface information I selected in (i).

(iii) The first shape function F1 and the second shape function F2 that pass through more pieces of road surface information I (or in which more pieces of road surface information I are present within a predetermined distance range) among the plurality of first shape functions F1 and second shape functions F2 calculated by repeatedly executing (i) and (ii) with different road surface information I selected in (i) are defined as a final first shape function F1 and a final second shape function F2.

When the "RANSAC" algorithm is used, the first shape function F1 or the second shape function F2 that pass through the largest number of pieces of road surface information I (or in which there are the largest number of pieces of road surface information I present within a predetermined distance range) among the first shape function F1 and the second shape function F2 calculated by repeatedly performing (i) and (ii) above may be determined to be the surface shape function F in the segmented region Gp, instead of determining both the first shape function F1 and the second shape function F2 in (iii) above.

Further, in a case in which the "RANSAC" algorithm is used, for example, a score to be given when the first shape function F1 or the second shape function F2 matches one piece of road surface information I (or when the one piece of road surface information I is within a predetermined range) may be set according to newness (acquisition time) of the one piece of road surface information I, and a sum of the scores calculated for each piece of road surface information I included in the segmented region Gp may be defined as a degree of matching the road surface information I and the first shape function F1 or the second shape function F2. In this case, the first shape function F1 or the second shape function F2 in which a maximum degree of matching has been calculated may be determined as the surface shape function F of the segmented region Gp.

Figure 10A:
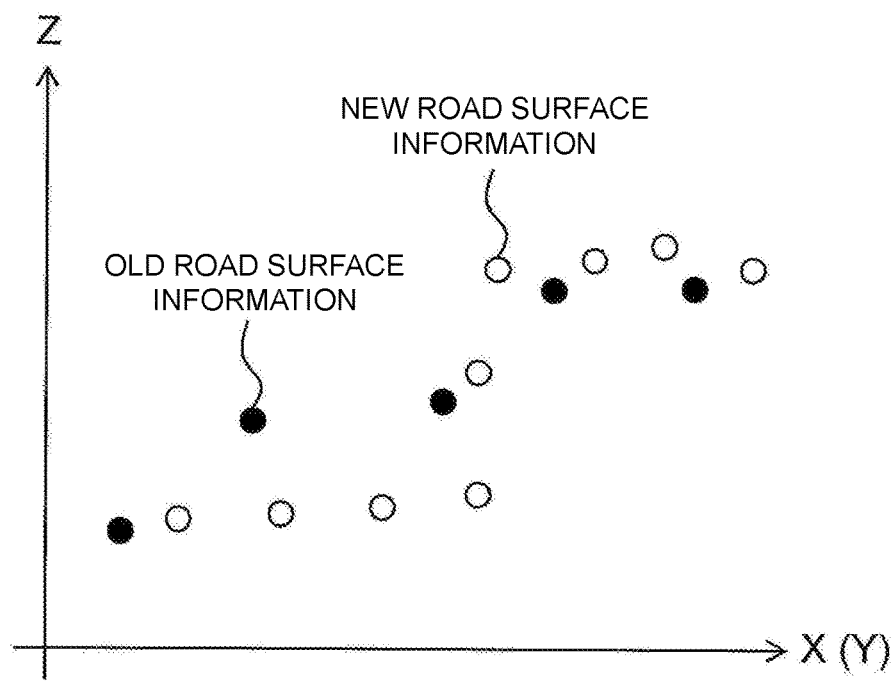
FIG. 10A is a diagram illustrating an example of a method of determining a surface shape function using RANSAC in a case in which new road surface information and old road surface information coexist (part 1).
Figure 10B:
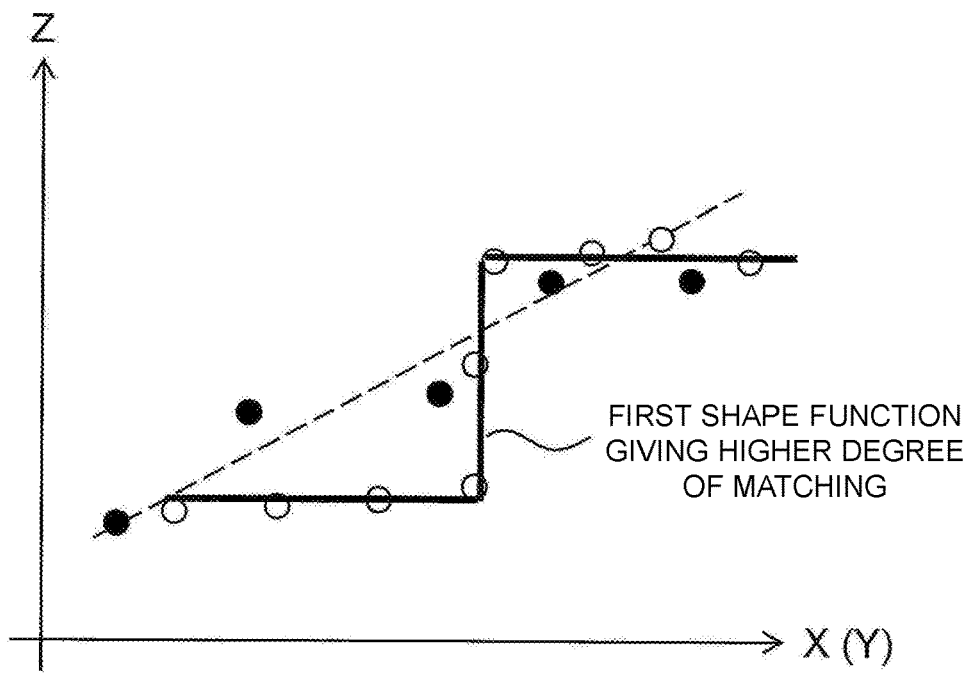
FIG. 10B is a diagram illustrating an example of a method of determining a surface shape function using RANSAC in a case in which new road surface information and old road surface information coexist (part 2).

Here, for example, as illustrated in FIG. 10A, the segmented region Gp in which old road surface information (road surface information indicated by black dots) and new road surface information (road surface information indicated by white dots) coexist is considered. In such a segmented region Gp, the first shape function F1 indicated by a solid line in FIG. 10B matches more new road surface information I than the second shape function F2 indicated by the dotted line in FIG. 10B. That is, the degree of matching of the first shape function F1 indicated by the solid line in FIG. 10B is higher than the degree of matching of the second shape function F2 indicated by the dotted line in FIG. 10B. FIGS. 10A and 10B are diagrams illustrating an example of a method of determining a surface shape function using RANSAC when new road surface information and old road surface information coexist.

As described above, by determining the first shape function F1 or the second shape function F2 having the higher degree of matching to be the surface shape function F of the segmented region Gp, the surface shape function F matching the new road surface information I with a higher reliability (or including the large number of new road surface information I within a predetermined range) can be calculated.

Other nonlinear optimization algorithm can also be used as the method of calculating the first shape function F1 and the second shape function F2 matching the road surface information I included in the segmented region Gp.

INDUSTRIAL APPLICABILITY

The present invention can be widely applied to a road surface shape measuring device that measures the surface shape of the road surface having undulation or the like.

The invention claimed is:

1. A road surface shape measuring device that measures a shape of a road surface having undulation, the road surface shape measuring device comprising:
    a sensor that acquires road surface information for a plurality of points on the road surface, the road surface information including a road surface position of the road surface on a reference plane divided into a plurality of segmented regions, and a road surface height indicating a height from the reference plane of the road surface at the road surface position; and
    a processor that determines a shape of a part or all of the road surface by estimating a surface shape using the road surface information included in a segmented region for each segmented region.

2. The road surface shape measuring device according to claim 1, further comprising:
    wherein the sensor measures energy reflected by the road surface;
    acquires a distance image including a plurality of pixels each having a distance between the road surface and the sensor measured on the basis of the energy as a pixel value; and
    calculates the road surface information by associating each pixel of the distance image with a position of the reference plane to calculate the road surface position and calculating the road surface height at the road surface position on the basis of the pixel value of each pixel.

3. The road surface shape measuring device according to claim 2,
    wherein, when there are a predetermined number or more of pieces of road surface information in the segmented region, the processor determines that the surface shape of the segmented region is estimated, and
    when there are not the predetermined number or more of pieces of road surface information in the segmented region, the processor determining unit determines that the surface shape of the segmented region is not estimated.

4. The road surface shape measuring device according to claim 2, wherein, when a number of a plurality of pieces of road surface information included in the segmented region in which the surface shape is to be estimated increases as compared with a number at a time of previous estimation of the surface shape, the processor updates the previous estimation of the surface shape using the road surface information of which the number of the plurality of pieces has increased.

5. The road surface shape measuring device according to claim 2, wherein, when a surface shape estimated for one segmented region and a surface shape estimated for a segmented region adjacent to the one segmented region are discontinuous within the reference plane, the processor corrects the surface shape estimated for the one segmented region to be continuously connected to the surface shape estimated for the adjacent segmented region.

6. The road surface shape measuring device according to claim 2, wherein a size of the segmented region is determined on the basis of a distance between the sensor and the segmented region in the reference plane.

7. The road surface shape measuring device according to claim 2,
wherein the sensor moves on the reference plane and accumulates the road surface information acquired at different times while moving, and
the processor estimates the surface shape using the accumulated road surface information.

8. The road surface shape measuring device according to claim 2,
wherein the processor estimates a surface shape function that is calculated by fitting a predetermined function to the road surface information included in the segmented region as the surface shape in the segmented region.

9. The road surface shape measuring device according to claim 2, wherein the processor determines a road surface state of the road surface on the basis of the surface shape estimated by the processor.

10. The road surface shape measuring device according to claim 1,
wherein, when there are a predetermined number or more of pieces of road surface information in the segmented region, the processor determines that the surface shape of the segmented region is estimated, and
when there are not the predetermined number or more of pieces of road surface information in the segmented region, the processor determines that the surface shape of the segmented region is not estimated.

11. The road surface shape measuring device according to claim 1, wherein, when a number of a plurality of pieces of road surface information included in the segmented region in which the surface shape is to be estimated increases as compared with a number at a time of previous estimation of the surface shape, the processor updates the previous estimation of the surface shape using the road surface information of which the number of the plurality of pieces has increased.

12. The road surface shape measuring device according to claim 1, wherein, when a surface shape estimated for one segmented region and a surface shape estimated for a segmented region adjacent to the one segmented region are discontinuous within the reference plane, the processor corrects the surface shape estimated for the one segmented region to be continuously connected to the surface shape estimated for the adjacent segmented region.

13. The road surface shape measuring device according to claim 1, wherein a size of the segmented region is determined on the basis of a distance between the sensor and the segmented region in the reference plane.

14. The road surface shape measuring device according to claim 1,
wherein the sensor moves on the reference plane and accumulates the road surface information acquired at different times while moving, and
the processor estimates the surface shape using the accumulated road surface information.

15. The road surface shape measuring device according to claim 1,
wherein the processor estimates a surface shape function that is calculated by fitting a predetermined function to the road surface information included in the segmented region as the surface shape in the segmented region.

16. The road surface shape measuring device according to claim 15, wherein the processor estimates a surface shape function matching the road surface information with a newer acquisition time as representing the surface shape of the segmented region during calculation of the surface shape function.

17. The road surface shape measuring device according to claim 15, wherein the predetermined function includes a first shape function representing a step on the road surface and a second shape function representing an inclined plane on the road surface, and the processor estimates a shape function further matching the road surface information included in the segmented region among the first shape function and the second shape function as the surface shape function.

18. The road surface shape measuring device according to claim 1, wherein the processor determines a road surface state of the road surface on the basis of the surface shape estimated by the processor.

19. A measuring method for measuring a shape of a road surface having undulation, the measuring method comprising:
a step of acquiring road surface information for a plurality of points on the road surface, the road surface information including a road surface position of the road surface on a reference plane divided into a plurality of segmented regions, and a road surface height indicating a height from the reference plane of the road surface at the road surface position; and
a step of determining a shape of a part or all of the road surface by estimating a surface shape using the road surface information included in a segmented region for each segmented region.

20. A non-transitory computer-readable medium comprising a program that causes a computer to execute the measuring method according to claim 19.

* * * * *